(12) United States Patent
Imes et al.

(10) Patent No.: US 10,805,226 B2
(45) Date of Patent: Oct. 13, 2020

(54) RESOURCE MANAGER, SYSTEM, AND METHOD FOR COMMUNICATING RESOURCE MANAGEMENT INFORMATION FOR SMART ENERGY AND MEDIA RESOURCES

(71) Applicant: SAMSUNG ELECTRONICS CO., LTD., Suwon-si, Gyeonggi-do (KR)

(72) Inventors: Kevin R. Imes, Austin, TX (US); James Hollister, Round Rock, TX (US); John Cottrell, Austin, TX (US); Jarod Addison, Austin, TX (US); Xiyin Yao, Austin, TX (US); Colby White, Austin, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/325,655

(22) Filed: Jul. 8, 2014

(65) Prior Publication Data
US 2015/0019736 A1 Jan. 15, 2015

Related U.S. Application Data

(63) Continuation of application No. 13/600,166, filed on Aug. 30, 2012, now abandoned.
(Continued)

(51) Int. Cl.
*G06F 16/95* (2019.01)
*H04L 12/24* (2006.01)
(Continued)

(52) U.S. Cl.
CPC .......... *H04L 47/70* (2013.01); *H04L 12/2827* (2013.01); *G06F 16/435* (2019.01);
(Continued)

(58) Field of Classification Search
CPC ............... H04L 12/2803; H04L 12/282; H04L 12/2816; H04L 12/2818; H04L 12/2823;
(Continued)

(56) References Cited

U.S. PATENT DOCUMENTS

| | | | |
|---|---|---|---|
| 1,568,584 A | 1/1926 | Blankenship | |
| 2,042,633 A | 6/1936 | Richardson | |

(Continued)

FOREIGN PATENT DOCUMENTS

| | | | |
|---|---|---|---|
| EP | 1814260 A2 | 1/2007 | |
| EP | 1814260 A2 | 8/2007 | |

(Continued)

OTHER PUBLICATIONS

Johnson, Joshua, "How to Automate Your House with Your iPhone", Apr. 14, 2010, retreived from the Internet on Jul. 27, 2016 at <http://iphone.appstorm.net/how-to/remote/how-to-automate-your-house-with-your-iphone/>.*

(Continued)

*Primary Examiner* — Faisal M Zaman
(74) *Attorney, Agent, or Firm* — Staas & Halsey LLP

(57) ABSTRACT

According to an aspect of the disclosure, a resource management platform, system and method of communicating resource management information for smart energy and media resources is provided. A resource management platform can include an interface configured to communicate media management information and energy management information. The resource management platform also includes a processor configured to detect an incoming communication to alter an operating condition in response to receiving the media management information or the energy management information. The processor can further be configured to initiate an output of media content in response to detecting media management information, and initiate (Continued)

altering an operating status of a device in response to detecting the energy management information. The processor can also initiate storing at least a portion of the media content and the energy management information within a memory.

4 Claims, 12 Drawing Sheets

Related U.S. Application Data

(60) Provisional application No. 61/606,728, filed on Mar. 5, 2012, provisional application No. 61/529,018, filed on Aug. 30, 2011.

(51) Int. Cl.
  *H04L 12/28* (2006.01)
  *G06F 16/435* (2019.01)
  *H04L 12/911* (2013.01)

(52) U.S. Cl.
  CPC .......... *G06F 16/95* (2019.01); *H04L 41/0253* (2013.01); *H04L 2012/285* (2013.01); *H04L 2012/2849* (2013.01)

(58) Field of Classification Search
  CPC ....... H04W 4/02; H04W 12/08; H04W 4/023; H04W 4/025; H04W 64/00; H04W 4/021; H04W 4/028
  USPC .......................................................... 710/303
  See application file for complete search history.

(56) References Cited

U.S. PATENT DOCUMENTS

| | | |
|---|---|---|
| 2,427,965 A | 9/1947 | Henderson |
| 2,931,006 A | 3/1960 | Klumpp, Jr. |
| 2,960,677 A | 11/1960 | Stearn et al. |
| 3,194,957 A | 7/1965 | Caldwell et al. |
| 3,237,148 A | 2/1966 | Ege |
| 3,531,759 A | 9/1970 | Hansen |
| 3,675,183 A | 7/1972 | Drake |
| 3,808,602 A | 4/1974 | Hoeffel et al. |
| 4,407,447 A | 10/1983 | Sayegh |
| 4,437,716 A | 3/1984 | Cooper |
| 4,497,031 A | 1/1985 | Froehling et al. |
| 4,645,286 A | 2/1987 | Isban et al. |
| 5,127,575 A | 7/1992 | Beerbaum |
| 5,274,571 A | 12/1993 | Hesse et al. |
| 5,289,362 A | 2/1994 | Liebl et al. |
| 5,461,390 A | 10/1995 | Hoshen |
| 5,476,221 A | 12/1995 | Seymour |
| 5,537,339 A | 7/1996 | Naganuma et al. |
| 5,544,036 A | 8/1996 | Brown, Jr. et al. |
| 5,566,084 A | 10/1996 | Cmar |
| 5,595,342 A | 1/1997 | McNair et al. |
| 5,682,949 A | 11/1997 | Ratcliffe et al. |
| 5,725,148 A | 3/1998 | Hartman |
| 5,729,442 A | 3/1998 | Frantz |
| 5,764,146 A | 6/1998 | Baldwin et al. |
| 5,812,949 A | 9/1998 | Taketsugu |
| 5,819,840 A | 10/1998 | Wilson et al. |
| 5,884,072 A | 3/1999 | Rasmussen |
| 5,964,625 A | 10/1999 | Farley |
| 5,987,379 A | 11/1999 | Smith |
| 6,014,080 A | 1/2000 | Layson, Jr. |
| 6,073,019 A | 6/2000 | Lowdon |
| 6,108,614 A | 8/2000 | Lincoln et al. |
| 6,128,661 A | 10/2000 | Flanagin et al. |
| 6,166,496 A * | 12/2000 | Lys .................... H05B 33/0857 315/292 |
| 6,175,078 B1 | 1/2001 | Bambardekar et al. |
| 6,353,180 B1 | 3/2002 | Debartolo, Jr. et al. |
| 6,400,956 B1 | 6/2002 | Richton |
| 6,442,639 B1 | 8/2002 | McElhattan |
| 6,478,233 B1 | 11/2002 | Shah |
| 6,483,028 B2 | 11/2002 | Debartolo, Jr. et al. |
| 6,553,418 B1 | 4/2003 | Collins et al. |
| 6,604,158 B1 * | 8/2003 | Fallon .................... G06F 3/0608 709/246 |
| 6,623,311 B1 | 9/2003 | Dehan |
| 6,636,893 B1 | 10/2003 | Fong |
| 6,684,087 B1 | 1/2004 | Yu et al. |
| 6,785,542 B1 | 8/2004 | Blight et al. |
| 6,785,630 B2 | 8/2004 | Kolk et al. |
| 6,850,252 B1 | 2/2005 | Hoffberg |
| 6,868,293 B1 | 3/2005 | Schurr et al. |
| 6,975,958 B2 | 12/2005 | Bohrer et al. |
| 6,976,366 B2 | 12/2005 | Starling et al. |
| 6,980,659 B1 | 12/2005 | Barnum |
| 6,999,757 B2 | 2/2006 | Bates et al. |
| 7,016,751 B2 | 3/2006 | Nordquist et al. |
| 7,031,945 B1 | 4/2006 | Donner |
| 7,082,460 B2 | 7/2006 | Hansen et al. |
| 7,083,109 B2 | 8/2006 | Pouchak |
| 7,099,483 B2 | 8/2006 | Inagaki |
| 7,114,554 B2 | 10/2006 | Bergman et al. |
| 7,127,328 B2 | 10/2006 | Ransom |
| 7,127,734 B1 | 10/2006 | Amit |
| 7,130,719 B2 | 10/2006 | Ehlers et al. |
| 7,139,564 B2 | 11/2006 | Hebert |
| 7,140,551 B2 | 11/2006 | De Pauw et al. |
| 7,155,305 B2 | 12/2006 | Hayes et al. |
| 7,159,789 B2 | 1/2007 | Schwendinger et al. |
| 7,188,003 B2 | 3/2007 | Ransom et al. |
| 7,197,011 B2 | 3/2007 | Fong |
| 7,216,021 B2 | 5/2007 | Matsubara et al. |
| 7,222,800 B2 | 5/2007 | Wruck |
| 7,224,966 B2 | 5/2007 | Caspi et al. |
| 7,257,397 B2 | 8/2007 | Shamoon et al. |
| 7,343,226 B2 | 3/2008 | Ehlers et al. |
| 7,349,761 B1 | 3/2008 | Cruse |
| 7,363,053 B2 | 4/2008 | Dalton et al. |
| 7,403,838 B2 | 7/2008 | Deen et al. |
| 7,444,401 B1 | 10/2008 | Keyghobad et al. |
| 7,451,017 B2 | 11/2008 | McNally |
| 7,460,827 B2 | 12/2008 | Schuster et al. |
| 7,477,617 B2 | 1/2009 | Chen et al. |
| 7,510,126 B2 | 3/2009 | Rossi et al. |
| 7,525,425 B2 | 4/2009 | Diem |
| 7,526,539 B1 | 4/2009 | Hsu |
| 7,554,437 B2 | 6/2009 | Axelsen |
| 7,565,225 B2 | 7/2009 | Dushane |
| 7,567,844 B2 | 7/2009 | Thomas et al. |
| 7,574,208 B2 | 8/2009 | Hanson et al. |
| 7,574,283 B2 | 8/2009 | Wang et al. |
| 7,590,703 B2 | 9/2009 | Cashman et al. |
| 7,644,591 B2 | 1/2010 | Singh et al. |
| 7,665,670 B2 | 2/2010 | Ahmed |
| 7,668,532 B2 | 2/2010 | Shamoon et al. |
| 7,671,544 B2 | 3/2010 | Clark et al. |
| 7,693,581 B2 | 4/2010 | Callaghan et al. |
| 7,706,928 B1 | 4/2010 | Howell et al. |
| 7,715,951 B2 | 5/2010 | Forbes et al. |
| 7,747,739 B2 | 6/2010 | Bridges et al. |
| 7,752,309 B2 | 7/2010 | Keyghobad et al. |
| 7,761,910 B2 | 7/2010 | Ransom |
| 7,775,453 B2 | 8/2010 | Hara |
| 7,783,738 B2 | 8/2010 | Keyghobad et al. |
| 7,792,946 B2 | 9/2010 | Keyghobad et al. |
| 7,798,417 B2 | 9/2010 | Snyder et al. |
| 7,812,766 B2 | 10/2010 | Leblanc et al. |
| 7,813,826 B2 * | 10/2010 | Reichelt ................. G11B 27/28 381/58 |
| 7,813,831 B2 | 10/2010 | McCoy et al. |
| 7,865,252 B2 | 1/2011 | Clayton |
| 7,881,816 B2 | 2/2011 | Mathiesen et al. |
| 7,884,727 B2 | 2/2011 | Tran |
| 7,886,166 B2 | 2/2011 | Schnekendorf et al. |
| 7,895,257 B2 | 2/2011 | Helal et al. |
| 7,908,019 B2 | 3/2011 | Ebrom et al. |
| 7,908,116 B2 | 3/2011 | Steinberg et al. |

(56) References Cited

U.S. PATENT DOCUMENTS

| | | |
|---|---|---|
| 7,908,117 B2 | 3/2011 | Steinberg et al. |
| 7,912,559 B2 | 3/2011 | McCoy et al. |
| 7,917,914 B2 | 3/2011 | McCoy et al. |
| 7,918,406 B2 | 4/2011 | Rosen |
| 7,921,429 B2 | 4/2011 | McCoy et al. |
| 7,941,530 B2 | 5/2011 | Ha et al. |
| 7,949,615 B2 | 5/2011 | Ehlers et al. |
| 7,953,518 B2 | 5/2011 | Kansal et al. |
| 7,973,707 B2 | 7/2011 | Verechtchiagine |
| 7,975,051 B2 | 7/2011 | Saint Clair et al. |
| 7,979,163 B2 | 7/2011 | Terlson et al. |
| 8,005,780 B2 | 8/2011 | McCoy et al. |
| 8,010,237 B2 | 8/2011 | Cheung et al. |
| 8,010,418 B1 | 8/2011 | Lee |
| 8,010,812 B2 | 8/2011 | Forbes, Jr. et al. |
| 8,014,722 B2 | 9/2011 | Abel |
| 8,019,445 B2 | 9/2011 | Marhoefer |
| 8,024,073 B2 | 9/2011 | Imes et al. |
| 8,028,049 B1 | 9/2011 | Ellis et al. |
| 8,028,302 B2 | 9/2011 | Glotzbach et al. |
| 8,032,233 B2 | 10/2011 | Forbes, Jr. et al. |
| 8,042,048 B2 | 10/2011 | Wilson et al. |
| 8,049,592 B2 | 11/2011 | Wang et al. |
| 8,063,775 B2 | 11/2011 | Reed et al. |
| 8,082,065 B2 | 12/2011 | Imes et al. |
| 8,090,477 B1 | 1/2012 | Steinberg |
| 8,091,765 B2 | 1/2012 | Jiang et al. |
| 8,091,795 B1 | 1/2012 | McLellan et al. |
| 8,099,195 B2 | 1/2012 | Imes et al. |
| 8,099,198 B2 | 1/2012 | Gurin |
| 8,108,076 B2 | 1/2012 | Imes et al. |
| 8,117,299 B2 | 2/2012 | Narayanaswami et al. |
| 8,126,685 B2 | 2/2012 | Nasle |
| 8,131,401 B2 | 3/2012 | Nasle |
| 8,140,279 B2 | 3/2012 | Subbloie |
| 8,140,667 B2 | 3/2012 | Keyghobad et al. |
| 8,176,112 B2 | 5/2012 | Hicks, IIII et al. |
| 8,204,979 B2 | 6/2012 | Vutharkar et al. |
| 8,214,270 B2 | 7/2012 | Schaefer et al. |
| 8,280,556 B2 | 10/2012 | Besore et al. |
| 8,306,634 B2 | 11/2012 | Nguyen et al. |
| 8,350,694 B1 | 1/2013 | Trundle et al. |
| 8,355,865 B2 | 1/2013 | Wagner et al. |
| 8,406,783 B2 | 3/2013 | Eitan et al. |
| 8,406,933 B2 | 3/2013 | Nagel et al. |
| 8,812,749 B2* | 8/2014 | Lippincott .............. H04N 5/76 710/14 |
| 2002/0073217 A1 | 6/2002 | Ma et al. |
| 2002/0140547 A1* | 10/2002 | Litwin, Jr. ............ G04G 7/00 375/354 |
| 2002/0147006 A1 | 10/2002 | Coon et al. |
| 2002/0194500 A1 | 12/2002 | Bajikar |
| 2002/0196151 A1 | 12/2002 | Troxler |
| 2002/0198984 A1 | 12/2002 | Goldstein et al. |
| 2003/0120817 A1 | 6/2003 | Ott et al. |
| 2003/0122684 A1 | 7/2003 | Porter et al. |
| 2003/0141987 A1* | 7/2003 | Hayes .................. G08C 19/28 340/12.25 |
| 2003/0149734 A1 | 8/2003 | Aaltonen et al. |
| 2003/0177012 A1* | 9/2003 | Drennan ............... G10L 15/26 704/275 |
| 2003/0195696 A1* | 10/2003 | Jones ................... G06Q 10/08 701/517 |
| 2003/0210126 A1 | 11/2003 | Kanazawa |
| 2004/0034484 A1 | 2/2004 | Solomita, Jr. et al. |
| 2004/0078153 A1 | 4/2004 | Bartone et al. |
| 2004/0087314 A1 | 5/2004 | Duncan |
| 2004/0119600 A1 | 6/2004 | Hampton |
| 2004/0133314 A1 | 7/2004 | Ehlers et al. |
| 2004/0193329 A1 | 9/2004 | Ransom et al. |
| 2005/0038326 A1 | 2/2005 | Mathur |
| 2005/0040247 A1 | 2/2005 | Pouchak |
| 2005/0040248 A1* | 2/2005 | Wacker ............... F24F 11/0086 236/51 |
| 2005/0040250 A1 | 2/2005 | Wruck |
| 2005/0044427 A1 | 2/2005 | Dunstan et al. |
| 2005/0060575 A1 | 3/2005 | Trethewey et al. |
| 2005/0090267 A1 | 4/2005 | Kotzin |
| 2005/0131583 A1 | 6/2005 | Ransom |
| 2005/0143863 A1 | 6/2005 | Ruane et al. |
| 2005/0144437 A1 | 6/2005 | Ransom et al. |
| 2005/0159847 A1* | 7/2005 | Shah ..................... G05B 15/02 700/276 |
| 2005/0172056 A1 | 8/2005 | Ahn |
| 2005/0194457 A1 | 9/2005 | Dolan |
| 2005/0242945 A1 | 11/2005 | Perkinson |
| 2005/0246561 A1 | 11/2005 | Wu et al. |
| 2006/0012489 A1 | 1/2006 | Yokota et al. |
| 2006/0063522 A1 | 3/2006 | McFarland |
| 2006/0097063 A1 | 5/2006 | Zeevi |
| 2006/0099971 A1 | 5/2006 | Staton et al. |
| 2006/0102732 A1 | 5/2006 | Garrett et al. |
| 2006/0122715 A1 | 6/2006 | Schroeder et al. |
| 2006/0142880 A1* | 6/2006 | Deen .................... G05B 15/02 700/19 |
| 2006/0161635 A1 | 7/2006 | Lamkin et al. |
| 2006/0179079 A1 | 8/2006 | Kolehmainen |
| 2006/0253894 A1 | 11/2006 | Bookman et al. |
| 2006/0265489 A1 | 11/2006 | Moore |
| 2006/0276175 A1 | 12/2006 | Chandran |
| 2006/0283965 A1 | 12/2006 | Mueller et al. |
| 2007/0005363 A1* | 1/2007 | Cucerzan ............... H04W 4/02 704/256 |
| 2007/0032225 A1 | 2/2007 | Konicek et al. |
| 2007/0037554 A1 | 2/2007 | Feeny |
| 2007/0037605 A1 | 2/2007 | Logan |
| 2007/0043477 A1 | 2/2007 | Ehlers et al. |
| 2007/0043478 A1 | 2/2007 | Ehlers et al. |
| 2007/0045431 A1 | 3/2007 | Chapman et al. |
| 2007/0054616 A1 | 3/2007 | Culbert |
| 2007/0055760 A1 | 3/2007 | McCoy et al. |
| 2007/0060171 A1 | 3/2007 | Sudit et al. |
| 2007/0061050 A1 | 3/2007 | Hoffknecht |
| 2007/0061266 A1 | 3/2007 | Moore et al. |
| 2007/0061487 A1 | 3/2007 | Moore et al. |
| 2007/0112939 A1 | 5/2007 | Wilson et al. |
| 2007/0114295 A1 | 5/2007 | Jenkins |
| 2007/0115902 A1 | 5/2007 | Shamoon et al. |
| 2007/0124026 A1 | 5/2007 | Troxell et al. |
| 2007/0136217 A1 | 6/2007 | Johnson et al. |
| 2007/0155401 A1 | 7/2007 | Ward et al. |
| 2007/0156265 A1 | 7/2007 | McCoy et al. |
| 2007/0156864 A1 | 7/2007 | McCoy et al. |
| 2007/0156882 A1 | 7/2007 | McCoy et al. |
| 2007/0158442 A1 | 7/2007 | Chapman et al. |
| 2007/0160022 A1 | 7/2007 | McCoy et al. |
| 2007/0162158 A1 | 7/2007 | McCoy et al. |
| 2007/0168486 A1 | 7/2007 | McCoy et al. |
| 2007/0176771 A1 | 8/2007 | Doyle |
| 2007/0188319 A1 | 8/2007 | Upton |
| 2007/0197236 A1 | 8/2007 | Ahn et al. |
| 2007/0198682 A1* | 8/2007 | Pazhyannur ........ H04L 65/1083 709/223 |
| 2007/0221741 A1 | 9/2007 | Wagner et al. |
| 2007/0240173 A1 | 10/2007 | McCoy et al. |
| 2007/0241203 A1 | 10/2007 | Wagner et al. |
| 2007/0249319 A1 | 10/2007 | Faulkner et al. |
| 2007/0273307 A1 | 11/2007 | Westrick et al. |
| 2007/0274241 A1 | 11/2007 | Brothers |
| 2007/0278320 A1* | 12/2007 | Lunacek ............... G05D 23/1902 236/94 |
| 2007/0282748 A1 | 12/2007 | Saint Clair et al. |
| 2007/0285510 A1 | 12/2007 | Lipton et al. |
| 2007/0287410 A1 | 12/2007 | Bae et al. |
| 2007/0287473 A1 | 12/2007 | Dupary |
| 2007/0288610 A1 | 12/2007 | Saint Clair et al. |
| 2007/0288975 A1 | 12/2007 | Cashman et al. |
| 2008/0004904 A1 | 1/2008 | Tran |
| 2008/0017722 A1 | 1/2008 | Snyder et al. |
| 2008/0046878 A1 | 2/2008 | Anderson |
| 2008/0082838 A1 | 4/2008 | Achariyakosol et al. |
| 2008/0099568 A1 | 5/2008 | Nicodem et al. |
| 2008/0103610 A1 | 5/2008 | Ebrom et al. |

(56) References Cited

U.S. PATENT DOCUMENTS

| | | |
|---|---|---|
| 2008/0104208 A1 | 5/2008 | Ebrom et al. |
| 2008/0104212 A1 | 5/2008 | Ebrom et al. |
| 2008/0109830 A1 | 5/2008 | Giozbach et al. |
| 2008/0127325 A1 | 5/2008 | Ebrom et al. |
| 2008/0137670 A1 | 6/2008 | Ebrom et al. |
| 2008/0158148 A1* | 7/2008 | Madonna ............... G06F 3/0482 345/156 |
| 2008/0162027 A1* | 7/2008 | Murphy ................ B60W 50/14 701/117 |
| 2008/0177678 A1 | 7/2008 | Di Martini et al. |
| 2008/0177994 A1 | 7/2008 | Mayer |
| 2008/0188963 A1 | 8/2008 | McCoy |
| 2008/0218307 A1 | 9/2008 | Schoettle |
| 2008/0219186 A1 | 9/2008 | Bell et al. |
| 2008/0219227 A1 | 9/2008 | Michaelis |
| 2008/0219239 A1 | 9/2008 | Bell et al. |
| 2008/0221737 A1 | 9/2008 | Josephson et al. |
| 2008/0249642 A1 | 10/2008 | Chen |
| 2008/0262820 A1 | 10/2008 | Nasle |
| 2008/0270562 A1 | 10/2008 | Jin et al. |
| 2008/0271123 A1 | 10/2008 | Ollis et al. |
| 2008/0272934 A1 | 11/2008 | Wang et al. |
| 2008/0277486 A1 | 11/2008 | Seem et al. |
| 2008/0277487 A1 | 11/2008 | Mueller et al. |
| 2008/0281472 A1 | 11/2008 | Podgorny et al. |
| 2008/0281666 A1 | 11/2008 | Kessman et al. |
| 2008/0291855 A1 | 11/2008 | Bata et al. |
| 2008/0305644 A1 | 12/2008 | Noda et al. |
| 2008/0313310 A1 | 12/2008 | Vasa et al. |
| 2009/0001182 A1 | 1/2009 | Siddaramanna et al. |
| 2009/0005061 A1 | 1/2009 | Ward et al. |
| 2009/0012704 A1 | 1/2009 | Franco et al. |
| 2009/0037938 A1 | 2/2009 | Frank |
| 2009/0062970 A1 | 3/2009 | Forbes, Jr. et al. |
| 2009/0063122 A1 | 3/2009 | Nasle |
| 2009/0063228 A1 | 3/2009 | Forbes, Jr. et al. |
| 2009/0065596 A1 | 3/2009 | Seem et al. |
| 2009/0076749 A1 | 3/2009 | Nasle |
| 2009/0082015 A1* | 3/2009 | Ravi .................... H04W 48/04 455/433 |
| 2009/0082888 A1 | 3/2009 | Johansen |
| 2009/0083167 A1 | 3/2009 | Subbloie |
| 2009/0093688 A1 | 4/2009 | Mathur |
| 2009/0098857 A1 | 4/2009 | De Atley |
| 2009/0098880 A1 | 4/2009 | Lindquist |
| 2009/0100492 A1 | 4/2009 | Hicks, III et al. |
| 2009/0103535 A1 | 4/2009 | McCoy et al. |
| 2009/0112522 A1 | 4/2009 | Rasmussen |
| 2009/0113037 A1 | 4/2009 | Pouchak |
| 2009/0129301 A1 | 5/2009 | Belimpasakis |
| 2009/0132070 A1 | 5/2009 | Ebrom et al. |
| 2009/0135836 A1 | 5/2009 | Veillette |
| 2009/0138099 A1 | 5/2009 | Veillette |
| 2009/0156208 A1* | 6/2009 | Vesterinen ............ H04W 48/08 455/435.1 |
| 2009/0157529 A1 | 6/2009 | Ehlers et al. |
| 2009/0160626 A1 | 6/2009 | Jeon et al. |
| 2009/0164049 A1 | 6/2009 | Nibler et al. |
| 2009/0187499 A1 | 7/2009 | Mulder et al. |
| 2009/0193217 A1 | 7/2009 | Korecki et al. |
| 2009/0195349 A1 | 8/2009 | Frader-Thompson et al. |
| 2009/0204837 A1 | 8/2009 | Raval et al. |
| 2009/0228825 A1* | 9/2009 | Van Os ................ G06F 3/0488 715/780 |
| 2009/0240381 A1 | 9/2009 | Lane |
| 2009/0248702 A1 | 10/2009 | Schwartz et al. |
| 2009/0267787 A1 | 10/2009 | Pryor et al. |
| 2009/0270138 A1 | 10/2009 | Raveendran |
| 2009/0302994 A1 | 12/2009 | Rhee et al. |
| 2009/0305644 A1 | 12/2009 | Rhee et al. |
| 2009/0312968 A1 | 12/2009 | Phillips et al. |
| 2009/0316671 A1 | 12/2009 | Rolf et al. |
| 2010/0017126 A1 | 1/2010 | Holcman et al. |
| 2010/0034386 A1 | 2/2010 | Choong et al. |
| 2010/0035587 A1 | 2/2010 | Bennett |
| 2010/0035613 A1 | 2/2010 | Schroter |
| 2010/0063867 A1 | 3/2010 | Proctor, Jr. et al. |
| 2010/0066507 A1 | 3/2010 | Myllymaeki |
| 2010/0069035 A1 | 3/2010 | Johnson |
| 2010/0069087 A1 | 3/2010 | Chow et al. |
| 2010/0070100 A1 | 3/2010 | Finlinson et al. |
| 2010/0070101 A1 | 3/2010 | Benes et al. |
| 2010/0075656 A1 | 3/2010 | Howarter et al. |
| 2010/0081375 A1* | 4/2010 | Rosenblatt ............ G08C 17/02 455/41.1 |
| 2010/0081468 A1 | 4/2010 | Brothers |
| 2010/0082174 A1 | 4/2010 | Weaver |
| 2010/0082176 A1 | 4/2010 | Chang |
| 2010/0082431 A1 | 4/2010 | Ramer et al. |
| 2010/0087932 A1 | 4/2010 | McCoy et al. |
| 2010/0088261 A1 | 4/2010 | Montalvo |
| 2010/0094475 A1 | 4/2010 | Masters et al. |
| 2010/0094737 A1 | 4/2010 | Lambird |
| 2010/0099410 A1 | 4/2010 | Sweeney et al. |
| 2010/0100253 A1 | 4/2010 | Fausak et al. |
| 2010/0113061 A1 | 5/2010 | Holcman |
| 2010/0115314 A1 | 5/2010 | Sultenfuss |
| 2010/0121499 A1 | 5/2010 | Besore et al. |
| 2010/0123414 A1 | 5/2010 | Antonopoulos |
| 2010/0127854 A1 | 5/2010 | Helvick et al. |
| 2010/0127889 A1 | 5/2010 | Vogel et al. |
| 2010/0130178 A1 | 5/2010 | Bennett et al. |
| 2010/0130213 A1 | 5/2010 | Vendrow et al. |
| 2010/0130234 A1* | 5/2010 | Shin .................... H04L 12/1859 455/456.3 |
| 2010/0138764 A1 | 6/2010 | Hatambeiki et al. |
| 2010/0141437 A1 | 6/2010 | Karam et al. |
| 2010/0145534 A1 | 6/2010 | Forbes, Jr. et al. |
| 2010/0152997 A1 | 6/2010 | De Silva et al. |
| 2010/0156665 A1 | 6/2010 | Krzyzanowski et al. |
| 2010/0159936 A1 | 6/2010 | Brisbois et al. |
| 2010/0161148 A1 | 6/2010 | Forbes, Jr. et al. |
| 2010/0161149 A1 | 6/2010 | Nguyen et al. |
| 2010/0164713 A1 | 7/2010 | Wedig et al. |
| 2010/0165861 A1 | 7/2010 | Rrdland et al. |
| 2010/0169030 A1 | 7/2010 | Parlos et al. |
| 2010/0174643 A1 | 7/2010 | Schaefer et al. |
| 2010/0179670 A1 | 7/2010 | Forbes, Jr. et al. |
| 2010/0179672 A1 | 7/2010 | Beckmann et al. |
| 2010/0179708 A1 | 7/2010 | Watson et al. |
| 2010/0187219 A1 | 7/2010 | Besore et al. |
| 2010/0188239 A1 | 7/2010 | Rockwell |
| 2010/0188279 A1 | 7/2010 | Shamilian et al. |
| 2010/0191352 A1 | 7/2010 | Quail |
| 2010/0193592 A1 | 8/2010 | Simon et al. |
| 2010/0198713 A1 | 8/2010 | Forbes, Jr. et al. |
| 2010/0207728 A1 | 8/2010 | Roscoe et al. |
| 2010/0217450 A1 | 8/2010 | Beal et al. |
| 2010/0217451 A1 | 8/2010 | Kouda et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crabtree et al. |
| 2010/0217651 A1 | 8/2010 | Crabtree et al. |
| 2010/0217837 A1 | 8/2010 | Ansari et al. |
| 2010/0218108 A1 | 8/2010 | Crabtree et al. |
| 2010/0222935 A1 | 9/2010 | Forbes, Jr. et al. |
| 2010/0228854 A1 | 9/2010 | Morrison et al. |
| 2010/0235008 A1 | 9/2010 | Forbes, Jr. et al. |
| 2010/0241275 A1 | 9/2010 | Crawford et al. |
| 2010/0249955 A1 | 9/2010 | Sitton |
| 2010/0250590 A1 | 9/2010 | Galvin |
| 2010/0256823 A1 | 10/2010 | Cherukuri et al. |
| 2010/0257539 A1 | 10/2010 | Narayanan et al. |
| 2010/0261465 A1 | 10/2010 | Rhoads et al. |
| 2010/0262298 A1 | 10/2010 | Johnson et al. |
| 2010/0262299 A1 | 10/2010 | Cheung et al. |
| 2010/0262336 A1 | 10/2010 | Rivas et al. |
| 2010/0272192 A1 | 10/2010 | Varadarajan et al. |
| 2010/0274475 A1* | 10/2010 | Antonenco ............ G01C 21/20 701/533 |
| 2010/0289643 A1 | 11/2010 | Trundle et al. |
| 2010/0299265 A1 | 11/2010 | Walters et al. |

(56) References Cited

U.S. PATENT DOCUMENTS

| | | |
|---|---|---|
| 2010/0299517 A1 | 11/2010 | Jukic et al. |
| 2010/0305773 A1 | 12/2010 | Cohen |
| 2010/0315235 A1 | 12/2010 | Adegoke et al. |
| 2010/0315438 A1 | 12/2010 | Horodezky et al. |
| 2010/0317332 A1 | 12/2010 | Bathiche et al. |
| 2010/0317371 A1 | 12/2010 | Westerinen et al. |
| 2010/0318198 A1 | 12/2010 | Smith et al. |
| 2010/0324956 A1 | 12/2010 | Lopez et al. |
| 2010/0324962 A1 | 12/2010 | Nesler et al. |
| 2010/0332373 A1 | 12/2010 | Crabtree et al. |
| 2011/0004350 A1 | 1/2011 | Cheifetz et al. |
| 2011/0004355 A1 | 1/2011 | Wang et al. |
| 2011/0004513 A1 | 1/2011 | Hoffberg |
| 2011/0007018 A1* | 1/2011 | McKinley .............. G08C 17/02 345/173 |
| 2011/0015797 A1 | 1/2011 | Gilstrap |
| 2011/0015802 A1 | 1/2011 | Imes |
| 2011/0016023 A1 | 1/2011 | Zakas |
| 2011/0022239 A1 | 1/2011 | Forbes, Jr. et al. |
| 2011/0022242 A1 | 1/2011 | Bukhin et al. |
| 2011/0029655 A1 | 2/2011 | Forbes, Jr. et al. |
| 2011/0030016 A1* | 2/2011 | Pino, Jr. .............. H04L 12/2818 725/80 |
| 2011/0039518 A1 | 2/2011 | Maria |
| 2011/0040666 A1 | 2/2011 | Crabtree et al. |
| 2011/0046792 A1 | 2/2011 | Imes et al. |
| 2011/0046798 A1 | 2/2011 | Imes et al. |
| 2011/0046799 A1 | 2/2011 | Imes et al. |
| 2011/0046800 A1 | 2/2011 | Imes et al. |
| 2011/0046801 A1 | 2/2011 | Imes et al. |
| 2011/0047482 A1 | 2/2011 | Arthurs et al. |
| 2011/0051823 A1 | 3/2011 | Imes et al. |
| 2011/0054699 A1 | 3/2011 | Imes et al. |
| 2011/0054710 A1 | 3/2011 | Imes et al. |
| 2011/0061014 A1 | 3/2011 | Frader-Thompson et al. |
| 2011/0063126 A1 | 3/2011 | Kennedy et al. |
| 2011/0063999 A1 | 3/2011 | Erdmann et al. |
| 2011/0069719 A1 | 3/2011 | Fries, IV et al. |
| 2011/0077789 A1 | 3/2011 | Sun |
| 2011/0098869 A1 | 4/2011 | Seo et al. |
| 2011/0106326 A1 | 5/2011 | Anunobi et al. |
| 2011/0106327 A1 | 5/2011 | Zhou et al. |
| 2011/0106681 A1 | 5/2011 | Cockerell et al. |
| 2011/0113090 A1 | 5/2011 | Peeri |
| 2011/0115875 A1 | 5/2011 | Sadwick et al. |
| 2011/0117878 A1 | 5/2011 | Barash et al. |
| 2011/0117927 A1 | 5/2011 | Doyle |
| 2011/0138024 A1 | 6/2011 | Chen et al. |
| 2011/0148626 A1 | 6/2011 | Acevedo |
| 2011/0153525 A1 | 6/2011 | Benco et al. |
| 2011/0160881 A1 | 6/2011 | Grey |
| 2011/0172837 A1 | 7/2011 | Forbes, Jr. |
| 2011/0173542 A1 | 7/2011 | Imes et al. |
| 2011/0202185 A1 | 8/2011 | Imes et al. |
| 2011/0202195 A1 | 8/2011 | Finch et al. |
| 2011/0202293 A1 | 8/2011 | Kobraei et al. |
| 2011/0211584 A1* | 9/2011 | Mahmoud .............. H04L 12/2834 370/401 |
| 2011/0214060 A1 | 9/2011 | Imes et al. |
| 2011/0224838 A1 | 9/2011 | Imes et al. |
| 2011/0227704 A1 | 9/2011 | Padmanabhan et al. |
| 2011/0231020 A1* | 9/2011 | Ramachandran .. G05D 23/1905 700/278 |
| 2011/0246606 A1 | 10/2011 | Barbeau et al. |
| 2011/0246898 A1 | 10/2011 | Imes et al. |
| 2011/0251725 A1 | 10/2011 | Chan |
| 2011/0252131 A1* | 10/2011 | Karaoguz .............. H04L 41/12 709/224 |
| 2011/0257809 A1 | 10/2011 | Forbes, Jr. et al. |
| 2011/0258022 A1 | 10/2011 | Forbes, Jr. et al. |
| 2011/0264290 A1 | 10/2011 | Drew |
| 2011/0264296 A1 | 10/2011 | Drake et al. |
| 2011/0282497 A1 | 11/2011 | Josephson et al. |
| 2011/0295393 A1 | 12/2011 | Lindahl |
| 2011/0296169 A1* | 12/2011 | Palmer .............. H04L 63/0428 713/153 |
| 2011/0302431 A1 | 12/2011 | Diab et al. |
| 2011/0307101 A1 | 12/2011 | Imes et al. |
| 2011/0316664 A1 | 12/2011 | Olcott et al. |
| 2012/0022709 A1 | 1/2012 | Taylor |
| 2012/0061480 A1 | 3/2012 | Deligiannis et al. |
| 2012/0124516 A1* | 5/2012 | Friedman .............. G06F 3/017 715/810 |
| 2012/0126020 A1 | 5/2012 | Filson et al. |
| 2012/0149388 A1* | 6/2012 | West .............. G01S 5/00 455/456.1 |
| 2012/0169249 A1 | 7/2012 | Loveland et al. |
| 2012/0179547 A1 | 7/2012 | Besore et al. |
| 2012/0189140 A1 | 7/2012 | Hughes et al. |
| 2012/0238252 A1* | 9/2012 | Levitan .............. H04L 63/102 455/414.1 |
| 2012/0297218 A1* | 11/2012 | Hsiu .............. G06F 1/3265 713/320 |
| 2012/0312874 A1 | 12/2012 | Jonsson |
| 2013/0087629 A1 | 4/2013 | Stefanski et al. |
| 2013/0099010 A1 | 4/2013 | Filson et al. |

FOREIGN PATENT DOCUMENTS

| | | |
|---|---|---|
| JP | H0879840 A | 3/1996 |
| JP | 2006092035 A | 4/2006 |
| WO | 2002027639 A1 | 4/2002 |
| WO | 2007109557 A2 | 9/2007 |
| WO | 2008134460 A1 | 11/2008 |
| WO | 2009034720 A1 | 3/2009 |
| WO | 2009036764 A2 | 3/2009 |
| WO | 2009067251 A1 | 5/2009 |
| WO | 2009097400 A1 | 8/2009 |

OTHER PUBLICATIONS

BAYweb Thermostat Owner's Manual, Bay Controls, LLC, published Nov. 11, 2009.
E4 Smart Digital Thermostat—E529, Inncom by Honeywell, published Aug. 2012.
International Search Report, dated Aug. 1, 2013, 3 pages.
Slavin, Alison Jane and Trundle, Stephen Scott, Remote Thermostat Control/Energy Monitoring, U.S. Appl. No. 61/179,224, filed May 18, 2009; 14 pages.
Gupta, Manu, A Persuasive GPS-Controlled Thermostat System, Royal Institute of Technology, Stockholm, Sweden, Jun. 2006; Pune Institute of Computer Technology, University of Pune, India, Jun. 2003 and Massachusetts Institute of Technology, Sep. 2008; 89 pages.
Gupta, Manu, Intille, Stephen S. and Larson, Kent, Adding GPS-Control to Traditional Thermostats: An Exploration of Potential Energy Savings and Design Challenges. House_n. Massachusetts Institute of Technology, Cambridge, MA 02142 USA. May 11-14, 2009, Springer-Verlag Berlin, Heideberg.
"A step-by-step guide to installing the 1st generation Nest Learning Thermostat," Article #1161, 2013 Nest Labs. pp. 1-6. http://http://support.nest.com/article/A-step-by-step-guide-to-installing-the-1st-generation-Nest-Learning-Thermostat, last accessed Feb. 1, 2013.
Klym et al., The Evolution of RFID Networks: The Potential for Disruptive Innovation, Mar. 2006, MIT Communication Futures Program, pp. 1-20.
Pering et al., Spontaneous Marriages of Mobile Devices and Interactive Space, Communication of the ACM, Sep. 2005, pp. 53-59.
Jaring et al., Improving Mobile Solution Workflows and Usability Using Near Field Communication Technology, 2007, Springer-Verlag Berlin Heidelberg, pp. 358-373.
"Wi-Fi", Wikipedia, printed Jul. 8, 2013.
Request Response, Wikipedia, printed Jul. 25, 2013.
Inncom International, Inc. "Installation User Manual", Revision 3.1, Sep. 12, 2006, pp. 1-36.
Peffer, T., et al. "A Tale of Two Houses: The Human Dimension of Demand Response Enabling Technology from a Case Study of an Adaptive Wireless Thermostat," ACEEE Summer Study on Energy Efficiency in Buildings, 2008.

(56) References Cited

OTHER PUBLICATIONS

BAYweb Thermostat system.
Stigge, B. "Informed Home Energy Behavior: Developing a tool for homeowners to monitor, plan and learn about energy conservation," Massachusetts Institute of Technology, 2001.
Mozer, M., et al. The Neurothermostat: Predictive Optimal Control of Residential Heating Systems. "Advances in Neural Information Processing Systems 9." MIT Press, 1997.
Inncom e529/X529 thermostat and logic board system.
Seligman, C., et al. Behavior Approaches to Residential Energy Conservation. "Saving Energy in the Home." Ballinger Publishing Co., 1978.
Canadian Office Action dated Apr. 19, 2017 in corresponding Canadian Patent Application No. 2,847,360.
European Office Action dated Jun. 20, 2017 in corresponding European Patent Application No. 12 772 560.4.
European Office Action dated Sep. 12, 2017 in corresponding European Patent Application No. 12 772 560.4.
Canadian Office Action dated Jan. 10, 2018 in corresponding Canadian Patent Application No. 2,847,360, 4 pages.
European Office Action dated Feb. 16, 2018 in corresponding European Patent Application No. 12 772 560.4, 9 pages.
European Office Action dated Jul. 25, 2018 in European Patent Application No. 12772560.4.
Canadian Notice of Allowance dated Oct. 26, 2018 in Canadian Patent Application No. 2,847,360.
European Communication dated Feb. 28, 2019 in European Patent Application No. 12772560.4.

\* cited by examiner

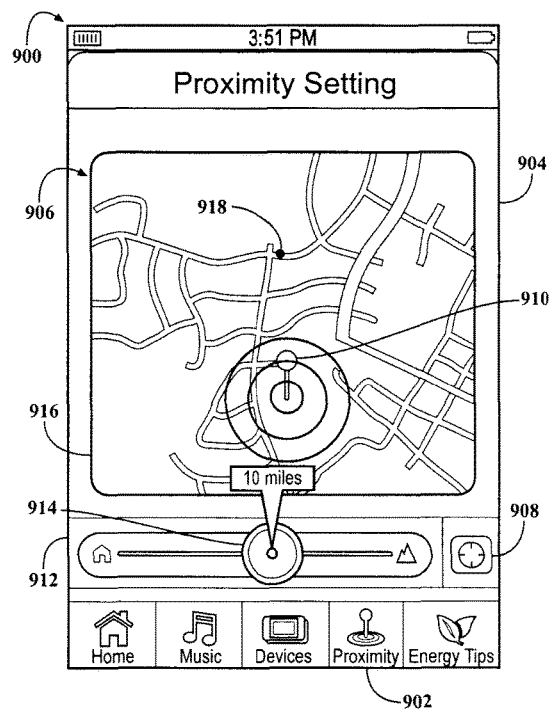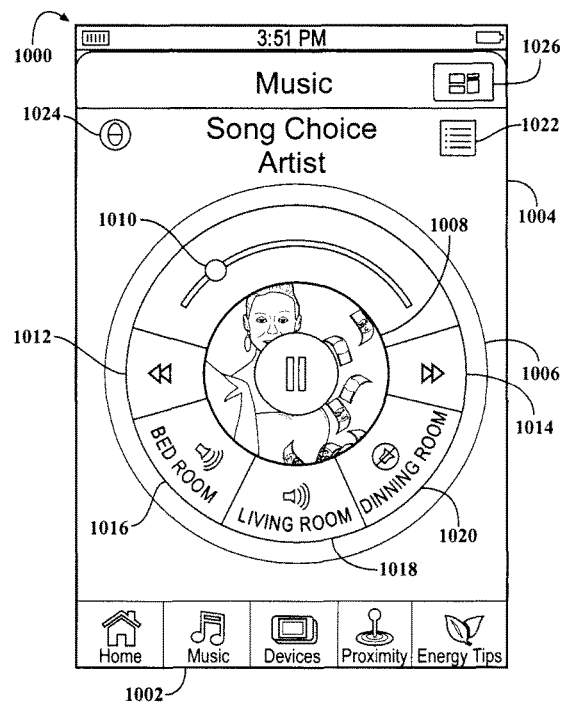
FIG. 9          FIG. 10

RESOURCE MANAGER, SYSTEM, AND METHOD FOR COMMUNICATING RESOURCE MANAGEMENT INFORMATION FOR SMART ENERGY AND MEDIA RESOURCES

CROSS-REFERENCE TO RELATED APPLICATIONS

The present application claims priority to U.S. patent application Ser. No. 13/600,166, entitled a "Resource Manager, System, and Method for Communicating Resource Management Information for Smart Energy and Media Resources, which was filed Aug. 30, 2012, and which claims priority to U.S. Provisional Patent Application Ser. No. 61/529,018, entitled "Customer Engagement Platform and Portal", which was filed Aug. 30, 2011 and U.S. Provisional Patent Application Ser. No. 61/606,728, entitled "Voice Controlled Network Devices and Systems", which was filed Mar. 5, 2012, the disclosures of which are hereby expressly incorporated by reference as though set forth fully herein.

FIELD OF THE DISCLOSURE

This disclosure relates to a resource manager, system, and method for communicating resource management information for smart energy and media resources.

BACKGROUND

Various forms of devices and communication protocols, both open standard and proprietary, are being used in the electronics industry. However, as standards lag behind technology development and consumer demand, it is becoming increasingly difficult to connect devices. One of the primary reasons home automation products have been too costly to own has been the initial cost of setting up a system. An installer would need to install each piece of equipment which leads to another increase in overall system cost. With the emergence of smart technologies and appliances within the home, the lack of interoperability has slowed progress and delayed efficiencies sought by energy companies and technology providers.

A key driver in connecting devices at the home is the smartphone and tablet markets. Consumers are becoming more and more connected and rely on instant access to music, photos, videos, and social networks. As these markets continue to drive the electronics industry, there is a need to leverage technology within the smart home, home automation, and home entertainment industries.

SUMMARY OF THE DISCLOSURE

According to an aspect of the disclosure, a resource manager, system and method of communicating resource management information for smart energy and media resources is provided.

According to a further aspect of the disclosure, a resource management platform can include an interface configured to communicate media management information and energy management information. The resource management platform also includes a processor configured to detect an incoming communication to alter an operating condition in response to receiving the media management information or the energy management information. The processor can further be configured to initiate an output of media content in response to detecting media management information, and initiate altering an operating status of a device in response to detecting the energy management information. The processor can also initiate storing at least a portion of the media content and the energy management information within a memory.

According to another aspect of the disclosure, a method of managing a resource is provided. The method includes receiving a communication including media management information or energy management information at a site, and detecting an incoming communication to alter an operating condition in response to receiving the media management information or the energy management information. The method further includes outputting media content in response to detecting media management information, and altering an operating status of a device in response to detecting the energy management information. The method also includes storing at least a portion of the media content and the energy management information within a memory.

According to a further aspect of the disclosure, a resource management platform can include a processor configured to detect an incoming communication to alter an operating condition in response to receiving media management information or energy management information. The processor can further be configured to initiate an output of media content in response to detecting the media management information, and initiate altering an operating status of a device in response to detecting the energy management information. The processor can further initiate storing at least a portion of the media content and the energy management information within a memory. The resource management platform can further include an interface configured to use one or more of a Zigbee based communication device, a Z-wave based communication device, a WiFi based communication device, a Bluetooth based communication device, and a Power Line based communication device.

According to another aspect of the disclosure, a resource management platform is provided and includes a thermostat control interface capable of altering an operating condition of an environmental control system. The resource management platform can also include a touchscreen display configurable to enable access to media content located at a remote media source, and a speaker operable to output audio accessed from the remote media source. The resource management platform can include an interface configured to communicate media content and energy management information at the site, and a processor configured to detect an incoming communication to alter an operating condition in response to receiving at least a portion of the media management information and at least a portion of the energy management information. The processor can further be configured to initiate an output of the media content in response to detecting the media management information, and initiate altering the operating condition of the environmental control system in response to detecting the energy management information. The processor can further be configured to initiate storing at least a portion of the media content and the energy management information within a memory.

Various other aspects of the disclosure are provided in the abstract, description of the drawings, and claims provided herein.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 9 illustrates a block diagram of a user interface configured to display resource information and input selectors according to an aspect of the disclosure;

FIG. 10 illustrates a block diagram of a user interface configured to display resource information and input selectors according to an aspect of the disclosure;

The use of the same reference symbols in different drawings indicates similar or identical items.

DETAILED DESCRIPTION OF DRAWINGS

Figure 1:
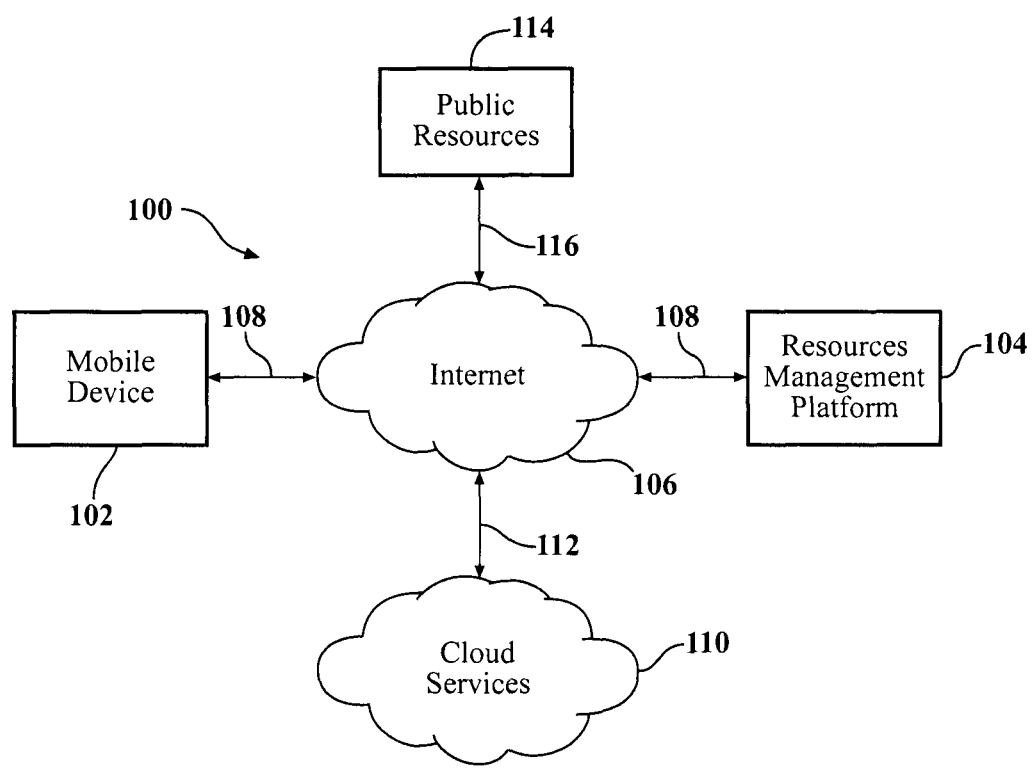
FIG. 1 illustrates a block diagram of a distributed resource management system configurable to manage resources at a site according to an aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a piece of hardware, software, firmware, middleware, another component of a computing system, or any combination thereof.

For purposes of this disclosure, a resource can include various types and combinations of systems, devices, software, applications, methods, drivers, media, services, controllers, platforms, interfaces, and can further include an environment management system, environment controller, energy management system, customer engagement portal, customer engagement platform, energy management apparatus, network device, controller, home automation controller, energy controller, controller module, site controller, processing resources, or any combination thereof can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, a resource can include one or any combination of an energy management system, an energy management device, a network device, a mobile device, a mobile application, a personal computer, a desktop application, a web-based interface, a hosted application, hosted software, hosted services, an application interface, a PDA, a consumer electronic device, a media device, a smart phone, a cellular or mobile phone, a smart utility meter, an advanced metering infrastructure, a smart energy device, an energy display device, a home automation controller, an energy hub, a smart energy gateway, a set-top box, a digital media subscriber system, a cable modem, a broadband communication device, a fiber optic enabled communications device, a media gateway, a home media management system, a robotically controlled device, a robotically controlled cleaning device such as a Broomba®, a media server, a game console, a network server, a network storage device, a wireless speaker, a customer engagement platform, a customer engagement portal, a retail energy provider's server, a wholesale energy provider's server, a COOP energy provider's server, a retail business server, a commercial site server, an industrial site server, a multi-residential site server, a temporary lodging server, a hotel server, a motel server, a condominium server, a utility provider's server which can include waste, water, power or combinations thereof, an energy substation, a news media server, a weather server, an advertisement server or service provider, a network radio server or service provider, a network media server or service provider, a music server or service provider, a search engine server or service provider, an information server or service provider, a wireless information network device, a vehicle charging station, a renewable energy production device, a renewable energy control device, an energy storage management system, a smart appliance, an HVAC system, a water pump, a heat pump, a hot water heater, a thermostat (TSTAT), an energy controller, an irrigation system, a lighting system, an alarm system, a smart power outlet, an energy detection device, a garage door opening system or device, a power measurement device, a power measurement unit, an air handler, a wireless air damper, a humidity control system, a heat and motion sensing device, a smart power outlet, a switch router, a wireless router, an automobile or transportation device, an electric vehicle, a network communication device, or any other suitable device or system, and can vary in size, shape, performance, functionality, and price.

According to an aspect, a resource can include one or any of a combination of memory, processing resources or controllers such as a microcontroller or central processing unit (CPU) or hardware or software control logic to enable management of a resource. Additional components of a resource can include one or more storage devices, one or more wireless, wired or any combination thereof of communications ports to communicate with external resources as well as various input and output (I/O) devices, such as a keyboard, a mouse, pointers, touch controllers, and display devices. A resource can also include one or more buses operable to transmit communication of management information between the various hardware components, and can communicate using wire-line communication data buses, wireless network communication, or any combination thereof. For example, a resource can deploy communication using a data bus internal to a device and can also include using a network, wireless network, wireless energy network, an information network, a wireless environment network, a wireless home environment network, or any other type of network capable of communicating resource information.

According to a further aspect, a resource can use any combination of devices or modules to communicate resource information, including a network that can include various types and variants of wireless and wire-line communication configurable to manage and establish communication at a site, including associated protocols or enhancements thereto including, but not limited to, any combination or portion of, IP-based communication, Broad-band communication, IEEE 802.15-based wireless communication, Zigbee communication, INSETEON communication, X10 communication protocol, Z-Wave communication, Bluetooth communication, WIFI communication, IEEE 802.11-based communication, a communication within a frequency range of 900 MHz-2.5 GHz; Infrared communication device, 6LowPAN communication, power line communication device, RFID communication, NFC communication, IEEE 802.16-based communication, Infrared-based communication, various proprietary wireless communications, or any combination thereof.

According to a further aspect, resource information can include information that can be processed and used by a resource, information that can be used to manage a resource, or any combination of thereof, and can include information received from a variety of sources. According to an aspect, resource information can include customer engagement information, media management information, media availability information, resource management information, media data, energy data, control data, content, media content, advertisements, videos, music, animated advertisements, energy management information, profile information, user information, device information, provisioning information, device identifiers, device names, model numbers, serial numbers, activation data such as date and time first used, IP addresses, coordinates of a site, coordinates of a resource, device drivers, and various other types of information described herein.

According to a further aspect, resource information can also include energy management information which can include any combination of information or data to manage energy production, consumption, curtailment, load shedding, purchase decisions, demand response decisions, or any combination thereof. Resource information can include any combination of real-time congestion data, energy transmission line operating conditions, syncrophasor data, firm owned alternative energy generator operating status, non-firm owned alternative energy generator operating status, locational marginal pricing data, congestion revenue rights data, energy storage capacity, stored energy output capacity, real time energy pricing data, historical energy pricing data, real time nodal demand data, historical nodal demand data, real time zonal demand data, historical zonal demand data, external market demand data, historical external market demand data, nodal price data, real time energy price data, real time energy demand data, historical energy demand data, historical energy price data, firm owned alternative energy generator data, non-firm owned alternative energy generator data, est. firm owned alternative energy generator output schedule, estimated non-firm owned alternative energy generator output schedule, macro environmental data, micro environmental data, real-time grid congestion data, historical grid congestion data, renewable energy credit information, carbon credit cap and trade pricing information, fixed and variable costs for operating alternative energy generators, production tax credit (PTC) pricing information, investment tax credit (ITC) information, federal grant information, credit-to-grant comparison analysis data, PTC to ITC analysis data, interest/finance data for alternative energy generators, asset depreciation schedules, available solar and wind output capacity, distributed energy production scheduling data, feed-in tariff data, baseline energy generator data, load utilization data, transmission efficiency data, congestion right revenue data, priority dispatch data, federal renewable portfolio standard (RPS) data, state renewable portfolio standard (RPS) data, net-metering data, current or forecasted % coal production data, current or forecasted % natural gas production data, current or forecasted % green house gas production data, current or future coal pricing data, current or future natural gas pricing data, current or future oil pricing data, current or future energy transmission pricing data, forecasted transmission price setting events, virtual capacity data, historical site performance data, seasonal weather and performance data, aggregate scheduling demand data, collaborative demand response data, historical device consumption data, forecasted device consumption data, or any combination thereof.

According to another aspect, a resource can be configured in various ways and can include one or any combination of services and capabilities to access and use resource information including but not limited to environment management capabilities, customer engagement capabilities, energy management capabilities, environment management capabilities, information service capabilities, account management capabilities, cloud based services, advertisement services, media management services, home security services, natural language processing capabilities, broadband services, update services, communication services such as instant messaging, pub-sub services, SMS services, mobile internet services, mobile gateway services, WAP services, update services, mobile media services, mobile advertisement services, location based services, location based advertisement services, geo-fencing services, weather services, demand response services, virtual demand response scheduling services, utility services, application services, third party application services, social media services, or other services or capabilities that can be used to manage one or more resources.

As described herein, a flow charted technique, method, or algorithm may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, system, or apparatus that comprises a list of features is not necessarily limited only to those features but may include other features not expressly listed or inherent to such process, method, article, system, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

FIG. 1 illustrates a block diagram of a distributed resource management system configurable to manage resources at a site according to an aspect of the disclosure. Resource management system, illustrated generally at 100, can include a mobile device 102, capable of being connected to a resource management platform 104 using the Internet 106 and communication 108. Resource management system 100 can also include cloud services 110 accessible using communication 112, and public resources 114 accessible using communication 116.

According to an aspect, mobile device 102 can include various types of devices that can be portable, such as an iPhone® device, Android® device, Blackberry® device, Windows® device, or any other mobile device, and can also include a tablet device such as an iPad®, Kindle®, and the like, a portable computer such as a laptop, portable electronics such as cameras, wireless radios, wireless speakers, or various other portable devices capable of being used with resource management system 100.

According to an aspect, communication with resource management platform 104 can include using any combination of communication described above. For example, mobile device 102 can communicate directly with resource management platform 104 using a local WIFI or 802.11 based communication, Bluetooth communication, or various other local wireless communication, or any combination thereof. According to a further aspect, mobile device 102 can communicate within a mobile environment using a subscriber based wireless data communication network such as a 3G network, 4G network, EDGE network, a cellular network, other wireless data communication, or any combination thereof.

According to an aspect, resource management platform 104 can include a platform, system, controller, device, methods, or any combination thereof to provide resource management capabilities. For example, resource management platform 104 can include a resource having a resource manager configured to manage and coordinate management of resources and resource information between one or more resources. As described herein and illustrated and described in FIGS. 2-15 are examples of resources, methods, interfaces that can deploy portions or all of resource management platform 104. According to an aspect, resource management platform 104 can be realized as a resource manager configured to manage one or more resources at a site.

According to a further aspect, mobile device 102 and resource management platform 104 can include embedded logic to enable an equivalent of one or more cloud services. For example, resource management platform 104 can include an energy server, customer engagement services, or various other types of services within resource management platform 104. According to an aspect, resource management platform 104 can include a Linux or other operating system capable of deploying a server, such as Apache, that can be used to provide cloud-based services. According to a further aspect, resource management platform 104 can be accessed as a cloud service in a similar manner as cloud services 110 by devices external to resource management platform 104.

According to another aspect, public resources 114 can include hosted resources that are generally publically available, or with minimal effort, can be accessed and utilized. Resources can include storage resources, communication infrastructure resources such as PUB-SUB, XMPP, Instant Messaging (IM), SMS messaging, TCP/IP, Internet communication infrastructure and protocol such as IPv4, IPv6 to support, in addition to other features, unique addresses for resources, and various other types of public resources that can be used in combination with communicating information using Internet 106.

According to another aspect, resource management system 100 can include using one or more cloud services 110. Cloud services 110 can be hosted by the same provider or in other instances, cloud services 110 can be hosted by multiple providers and accessed as needed or desired in various combinations. Cloud services 110 can include services described above and can also include one or combinations of, but are not limited to, sources that can include resource information such as a streaming music library source, streaming radio source, streaming video source, pay-per-view media source, paid music source, subscription services source, on-line photo source, energy management source, customer engagement source, utility source, thermostat management source, web-services source, home security source, website, customer engagement source, savings tip source, video source, software update source, a streaming music library source, or any combination thereof.

According to an aspect, resource management system 100 may be provided as a cloud-less system, capable of enabling use without depending on cloud services 110. For example, if energy management services are to be deployed, such as thermostat or environment control, resource management platform 104 can include embedded services capable of providing thermostat control. In other forms, mobile device 102 can include one or more applications that may use foreground and/or background processing capable of communicating directly with resource management platform 104 using public resources 114. As such, cloud services 110 need not be accessed or utilized thereby reducing the need and expense associated with maintaining hosted cloud services 110 for energy management services, thermostat control, or various other resource management methods or software.

According to another aspect, resource management system 100 can be used to manage multiple sites. For example, a user may have a primary residence and a secondary residence, business site, or various other types of sites that may have resources that need to be managed. As such, resource management system 100 can allow for adding and deleting multiple resource management platforms 104 as needed or desired. For example, as mobile device 102 moves away from a first resource management platform 104 at a site, an alarm, HVAC system or various other resources can be altered in response to detecting mobile device 102 leaving. As mobile device 102 approaches a second location having a resource management platform 104, operating conditions of resources accessible to resource management platform 104 can be altered as desired.

According to another aspect, resource management system 100 can be used to access resources to manage third party resources. For example, a user may have elderly parents or may be a care taker, physician, or the like having an interest in the health of an elderly person. As such, a third party resource such as a heart monitor, blood pressure monitor, prescription monitor, or various other health monitoring resources can be accessed via third party access. As such, a user in a remote location can be provided information in near real time about the condition of a patient or loved one. In other forms, an alarm system, video monitoring system, or various other resources of the elderly person can be accessed by the user and need not be limited to remote health monitoring resources.

According to a further aspect of the disclosure, resource management system 100 can include public resources 114 communication infrastructure to communicate information. For example, public resources 114 can include publish-subscribe (PUB-SUB) communication infrastructure to enable various types of communication such as chat rooms, instant messaging, and the like. For example, a publish-subscribe communication can include a messaging pattern where senders of messages, called publishers, need not program resource information to be sent directly to specific receivers, called subscribers. Instead, published resource information can be characterized into classes, without knowledge of what, if any, subscribers there may be. Similarly, subscribers express interest in one or more classes, and only receive messages that are of interest, without knowledge of what, if any, publishers there are. According to an aspect, a resource management platform 104 can include a publisher, and mobile device 102 or other resource can include a subscriber. A PUB-SUB messaging service can be provided and used by public resources 114. As such, public resources 114 hosting a PUB-SUB communication resource can be accessed by resource management system 100 to communicate information between any combination or number of resources including, but not limited to, cloud services 110, mobile device 102, resource management platform 104, and various other resources described herein. Resource management system 100 accessing a PUB-SUB resource allows for efficient communication of information without having to rely on a polling or other method of communication. For example, mobile device 102 can subscribe to resource management platform 104 hosting a virtual chat room. As such, mobile device 102 can publish resource information, such as XML encoded data, media content and references, resource information, media management information, energy management information, and various other types of information that can be used to manage a resource in near real-time due to the nature and performance of instant messaging and PUB-SUB technology. As such, resource management platform 104 can host a chat room that can allow for communication of resource information in an efficient manner and not have to rely on cloud services 110 to efficiently process and manage resource information. Although described as mobile device 102 subscribing to a chat room hosted by resource management platform 104, other embodiments can include a chat room being hosted by various other resources provided by resource management system 100, including but not limited to cloud services 110, mobile device 102, resource management platform 104, public resources 114, or various other resources or combination of resources that can be access using resource management system 100.

According to another aspect, resource management platform 104 can include energy management services as a part of resource management platform 104 and/or within a resource at a site. For example, a resource such as an Internet gateway device can include an energy server capable of altering operating conditions at a location to alter energy use for a user. According to an aspect, an Internet gateway, energy service, thermostat controller, lighting controller, media controller, and alarm controller can be provided within a single device. Resource management platform 104 can be used to process resource information for each resource and initiate control of each system using the same platform. As such, a user need not have multiple gateways, devices, controllers, or various other electronic devices distributed throughout the home to initiate control of a resource.

According to a further aspect, resource management system 100 can allow for or enable access to one or more on-line streaming media sources, such as Pandora, Slacker Radio, Spotify, TuneIn Radio, Weather services, YouTube, and any other combination of cloud services 110 accessible by resource management system 100. For example, resource management platform 104 can include encoded logic capable of accessing an API hosted by Pandora, and can manage streaming audio to one or more wireless speaker resources within a home. Resource management platform 104 can act as a bridge between Pandora and a wireless speaker, or can also act as a temporary bridge to initiate direct communication with a speaker resource. Additionally, a user may be able to select music from a mobile device or other resource capable of allowing selection of music from Pandora's hosted services, and communicating to a speaker resource.

According to a further aspect, mobile device 102 can also include proximity control functionality. For example, proximity control can include using various types of location services to detect a location of mobile device 102, and outputting resource information based on the location, distance, travel time, travel speed, and various other parameters that can be determined using location services. According to an aspect, other web services that may be cloud services 110 can also be accessed upon detecting a location of mobile device 102. For example, resource information may be communicated in response to a location update, and in addition, cloud service 110 may include a web service to provide information based on the current location (e.g. weather service, geotag service, geoad service, traffic service, regional media service, etc.). In this manner, location based information can be regionally generated based on a location of mobile device 102 in association with providing resource information, and a greater level of consumer engagement can be provided to the user.

According to another aspect, resource management system 100 can also include a video management service as a portion of cloud services 110. For example, video management services can include various types of videos or customer engagement content to be communicated to a specific resource management platform 104. According to an aspect, an energy tip video can be generated in a specific region for a specific utility market. As such, the energy tip video can be communicated to the resource management platform 104 and displayed using a resource at a site accordingly. According to another aspect, an energy tip video can be communicated to mobile device 102 allowing a user to view the energy tip video in a mobile environment. As a user views an energy tip video, the tip can be stored, saved, deleted, shared into a social network, as desired. Although described as an energy tip video, various other types of videos can be created and managed using cloud services 110 having a video management service.

According to a further aspect, video management services can also include managing video that may have been created by a user. For example, storage of videos can be provided using cloud services 110. In other forms, video management service can be provided within resource management platform 104. Video management service can be provided to efficiently store content on-line, using local resources, remote resources, or any combination thereof. A video management service can be used to enable limited access to other resource management platforms 104, mobile device 102, or various combinations thereof that have a common subscription. As such, a user may record a video using mobile device 102 and desire to communicate die video to a resource management platform owned by a separate user. As such, the user can temporarily access the non-owned resource management platform 104 as a visitor and upload content.

According to a further aspect, resource management system 100 can also include an advertisement management service to manage advertisements for third parties. For example, third party advertisements can be accessed using an advertisement management service and communicated using resource management system 100. For example, an advertisement for a local energy auditor can be communicated using resource management system 100.

According to a further aspect, resource management system 100 can include a video management service that can be used to manage video tutorials that can be used to educate users on how to use a resource when available. For example, a user may purchase a new HDTV. Resource management platform 104 may be used to identify the new HDTV being added and may enable display of video tutorials on how to use the new resource. In some forms, the tutorial can be generated by HDTV manufacturer and resource management platform 100 can be used to identify where the video tutorial may be stored.

According to another aspect, an HDTV may be detected by resource management platform 104 using a near field communication (NFC) device (described herein) and have encoded information about access to user guides, tutorials, accessories available via an on-line store, or various other types of specialized information. Resource management platform 104 can be used to read and process the encoded information, and communicate the HDTV information to the user using various resources available to a user and resource management platform 104.

According to another aspect, resource management system 100 can provision resources automatically. For example, a new resource may be added to resource management platform 104 using mobile device 102 and an NFC device embedded within a new resource. For example, a user may purchase a new appliance and may add the appliance to resource management platform 104 using mobile device 102 and NFC device of the appliance. When mobile device 102 recognizes the information on the NFC device, additional content can be accessed using cloud services 110. For example, mobile device 102 may include a tablet such as an iPad, Nook, Galaxy tablet, and the like. Upon recognition, resource management system 100 can access an electronic guide, such as an eBook, video, or various other forms of digital media, to step a user through a quick start, set-up, user manual, registration or other forms of digital media that can be used to engage a consumer. Cloud services 110 can include an up-to-date listing of available resources that can be accessed using data encoded within NFC device and RFID tags.

According to another aspect, a product warranty, registration, support, and various other aspects to purchasing a resource can also be managed using resource management system 100. For example, as a new resource is added to resource management system 100, registration information can automatically be sent to a manufacturer to register a product or resource. For example a user can provide a unique identifier of the resource, and in other forms an NFC can have information encoded, and resource management system 100 can register the new resource using encoded information and cloud services 110 used to register their product. According to another form, resource management system 100 can be used to track when a warranty may be expiring for a resource, and may communicate a message to a user about an expiring warranty. In some forms, resource management system 100 can provide a user access to purchasing an extended warranty to cover the resource. In this manner, a resource can be protected under a warranty as needed or desired.

Figure 2:
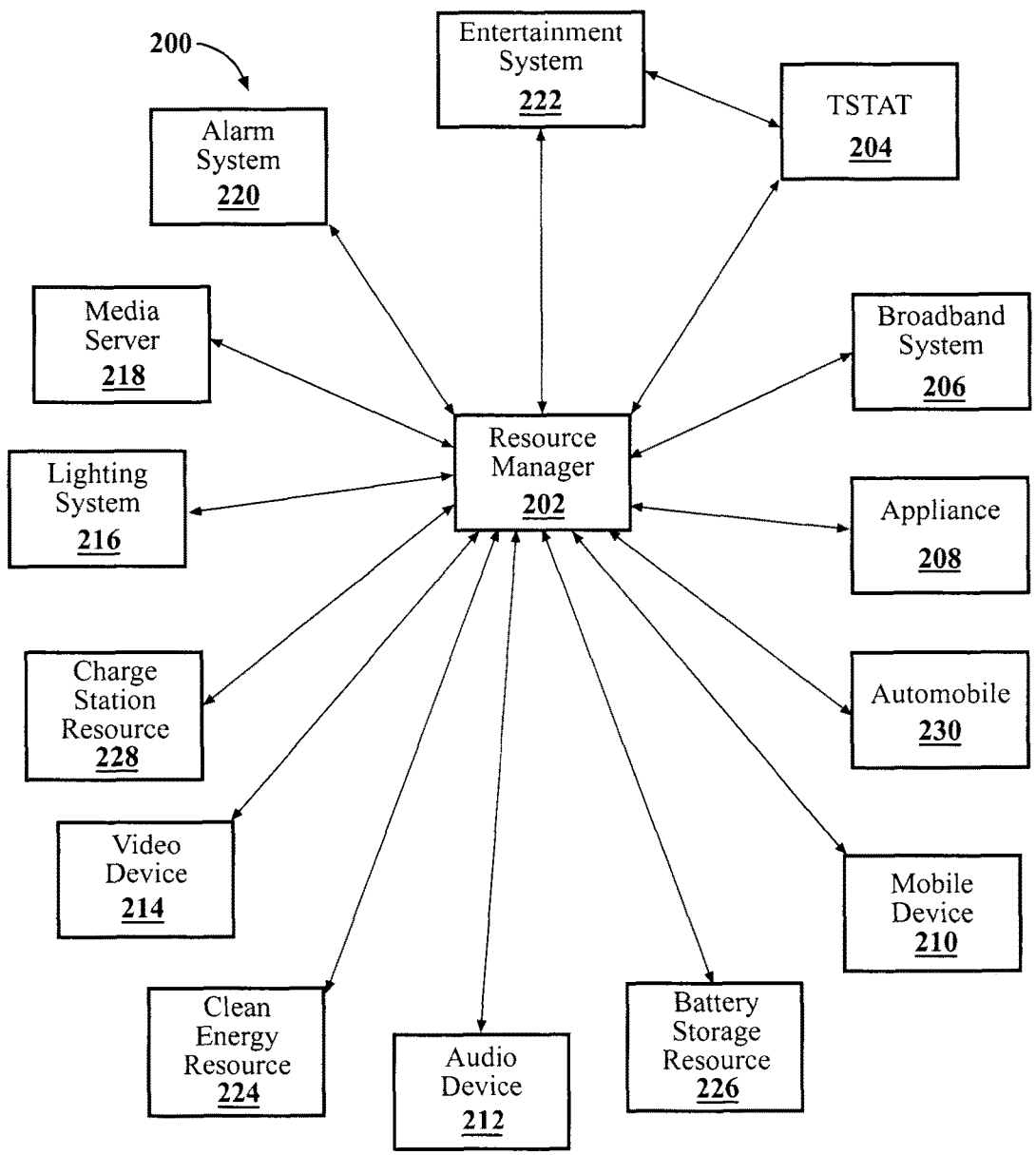
FIG. 2 illustrates a diagram of exemplary resources capable of being managed according to an aspect of the disclosure.

FIG. 2 illustrates a diagram of exemplary resources capable of being managed according to an aspect of the disclosure. A site 200 can include a resource management platform 202, configured to manage one or more resources at site 200. According to an aspect, resource management platform 202 can be configured to manage one or more resources at site 200, and in one form, can be realized as provided as a part of a resource, or as a separate device, such as resource management platform 104 described in FIG. 1, resource management platform 300 described in FIG. 3, resource management platform described in FIG. 4, or any other portion, system, method, device, controller, or any combination thereof capable of managing a resource. Additionally, site 200 is illustrated as a single site however it should be understood that multiple sites with multiple resources can be managed as needed or desired.

According to an aspect, resource management platform 202 can be used to manage a thermostat 204, a broadband system 206, appliance 208, mobile device 210, audio device 212, video device 214, lighting system 216, media server 218, alarm system 220, entertainment system 222, clean energy resource 224, battery storage resource 226, charge station resource 228, an automobile 230, and any other system, device, controller, apparatus, portal, or any combination thereof.

According to an aspect, resource management platform 202 can communicate directly with a resource, and in some forms, one or more resources can communicate directly with another. For example, TSTAT 204 can be used to communicate temperature information directly to entertainment system 222. As described herein, resource management platform 202 can be used to provision, add, remove, modify, or alter use of resources. Through providing a platform to enable seamless integration and management of resources at a site, and conveying site information among resources, efficient utilization and management of resources at a site can be realized.

Figure 3:
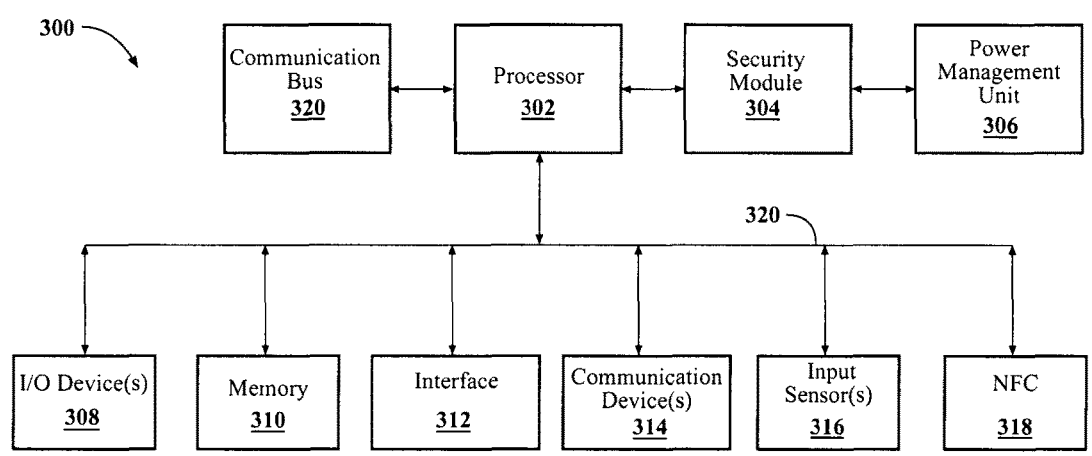
FIG. 3 illustrates a block diagram of a resource management platform configured to deploy a resource manager according to an aspect of the disclosure.

FIG. 3 illustrates a block diagram of a resource management platform configured to deploy a resource manager according to an aspect of the disclosure. A resource management platform 300 can include a processor 302, a security module 304 that can be integrated within processor and/or provided external to processor 302. Resource management platform 300 can be provided as a resource, a network device, a portal, a customer engagement portal, an energy management system, an environment management system, a resource manager, or any combination thereof and can be realized as a system, a controller, a network device or any combination thereof capable of deploying portions or all of resource management platform 300 illustrated in FIG. 3 and operable to use resource information to manage a resource. Resource management platform 300 can be provided as a resource manager, a resource to be managed, or a combination of both.

According to an aspect, resource management platform 300 can include processor 302 which can include an ARM based processor, and in some forms can include Freescale® i.MX-based processor, Kinetis processor, an Intel Atom® processor, or various other types of processors configurable to deploy a resource manager, resource management platform, a resource, or any combination thereof. Resource management platform 300 can also include an operating system, such as Linux, that can be executed by processor 302, and in one aspect, can include a Java environment to process Java code and applications. Other software environments can also be supported instead of, or in addition to, as needed or desired.

Resource management platform 300 can also include a power management unit (PMU) 306 configured to power various components of resource management platform 300. PMU 306 can also include monitoring capabilities to ensure sufficient power is available from a power source (not expressly illustrated in FIG. 3) and can initiate altering operation of one or more components of resource management platform 300. For example, a speaker sound level, display brightness, wireless radio operation, or various other higher-level power consuming devices can be altered using PMU 306 as needed or desired. According to a further aspect, PMU 306 can include a power supply capable of providing power and can include an rechargeable battery. In other forms an external power supply can be used. Resource management platform 300 can include an internal or external AC, DC, AC to DC converter power module, or any combination thereof to power customer engagement portal 300.

According to another aspect, resource management platform 300 can include I/O device(s) 308 which can include one or more of displays, buttons, speakers, microphones, cameras, touch sensors, keyboards, pointing devices, or various other types of I/O devices that can provide input and/or output capabilities. In other forms, various types of display technologies can be used having single color, multicolor, or any combination thereof, including, but not limited to LED displays, TFT displays, OLED displays, LCD displays, flexible lighting displays, flexible LED displays, thin film over LED, a pico projector, or any combination thereof. Various types and combinations of touch technologies can also be used including, but not limited to, resistive touch sensors, capacitive touch sensors, motion detecting sensors, infrared sensors, heat sensors, or various other types of sensors that can be used to detect an input from a user. According to a further aspect, resource management platform 300 can include one or more memory devices generally illustrated as memory 310. Memory 310 can include any combination of ROM, PROM, EPROM, EEPROM, Flash, or various other types of storage mediums including solid state, optical drives, HDD, or any combination thereof.

According to a further aspect, resource management platform 300 can include an interface 312 and one or more communication device(s) 314. One or more communication buses, generally illustrated at 320 can be used to communicate information. Interface 312 can be configured to include one or more types of interfaces including, but not limited to an interface, an information network interface, an external bus interface, an application program interface, a docking interface, or any combination thereof configurable to be coupled to one or more of buses 320 or any combination thereof. According to an aspect, interface 312 can be configured to use any combination of hardware, software, or firmware, and can include any combination or portion of a serial bus interface, a network bus interface, a parallel bus interface, a serial-parallel bus interface, a universal serial bus interface, industry standard bus interface, controller area network bus interface, a serial peripheral interface, an HDMI interface, a universal asynchronous receiver transmitter interface, a control bus interface, standard digital input output interface, a proprietary bus interface, or any combination thereof. Additionally, interface 312 can also include an information network interface, a network device identifier and profile information of module, wireless energy network message information, network protocol configuration data, or any combination thereof.

According to another aspect, interface 312 can include a hardware interface configured to be coupled to wiring to control a device and can include, for example, relays, light switches, control interfaces, terminal blocks, or various other interfaces that may be needed to connect resource management platform 300 to a control circuit to manage a resource. According to an aspect, a communication interface and a control circuit can be combined into the same interface.

According to an aspect, resource management platform 300 can be configured to include one or more communication device(s) 314 in module or chip form including, but not limited to, power-line communication, wire line communication, wireless communication, Zigbee based communication, INSETEON based communication, X10 based communication, Z-Wave based communication, WiMAX based communication, Bluetooth-based communication, WIFI based communication, 802.11-based communication, 802.15-based communication, 802.16-based communication, proprietary communication, other communications described herein, or any combination thereof.

According to an aspect, communication device(s) 314 can also include a broadband device configured to be coupled to a broadband network. For example, broadband device can include an Ethernet communication module, a Cable or coaxial-based communication module, and can include communication logic to receive and transmit data between resource management platform 300 and an information network such as a LAN, WAN, local network, the Internet, and the like. According to an aspect, a broadband device can include TCP/IP communication capabilities and can also be security enabled to transmit SSL data between resource management platform 300 and an information network.

According to an aspect, resource management platform 300 can also include an expansion slot (not expressly illustrated) such as a network interface card (NIC), Ethernet port, one or more USB interfaces or mini-USB interfaces, an SDIO slot, additional data or plug interfaces, Zigbee and Z-wave slot interfaces, or any combination thereof to increase memory capacity or other functionality that be added to resource management platform 300.

According to a further aspect, resource management platform 300 can include interface 312 configured to include a smart energy enabled communication interface configured to communicate using a smart energy protocol and one or more communication devices. According to an aspect, resource management platform 300 can incorporate Smart Energy Profile (SEP) version 2.0, herein incorporated by reference, or various other updates to SEP 2.0, and in some forms, previous versions of SEP can also co-exist with SEP 2.0 or later versions within resource management platform 300. For example, resource management platform 300 can receive information formatted to various versions of SEP standards and processed accordingly. As such, resource management platform 300 can be used to comply with Zigbee standards including, but not limited to, building automation, remote control, smart energy, health care, home automation, telecom services, network devices, gateways, or any combination thereof to manage a resource. According to an aspect, various other types of profiles or protocols can be used by system 300 and can be updated to add, delete, and modify as needed and can include any combination of a Smart Energy based profile, a Echonet Lite based profile, a Echonet based profile, a UPNP based profile, a DLNA based profile, a environment management based profile, a customer engagement based profile, a AirPlay based profile, a user profile, a device profile, a system profile, a source profile, customer profile, a site profile, custom or proprietary profile, or any combination thereof. According to an aspect, a profile can include only protocol information specific to a resource. However in other forms, in addition to, or in place of a protocol, profile can include additional information that can be used to manage a resource such as resource information, energy management information, information about other resources under management, communication infrastructure information, or various other types of information to manage a resource or any combination thereof.

According to a further aspect, communication device(s) 314 can be used in one or more different operating modes including, but not limited to, a bridge, an access point, a router, a network, an end point, a mesh network, or various other types of network topologies and configurations and needed or desired.

According to a further aspect, resource management platform 300 can include one or more input sensor(s) 316 capable of providing inputs to resource management platform 300. For example, inputs sensor(s) 316 can include temperature sensors, humidity sensors, light sensors, motion sensors, IR sensors, cameras or optical sensors, kinetic sensors, power sensing devices including electronic sensors, including, but not limited to current sensors, voltage sensors, impedance sensors, microphones, or any combination thereof. Other sensors can also include combinations of network bandwidth sensors, wireless signal sensors, bit-rate sensors communicating data, sensing audio and/or video quality or playback rates, or various other types of input sensors that can be used to manage a resource.

According to a further aspect, resource management platform 300 can also include a near field communication (NFC) device 318 that can be provided as a reader, a passive device or tag, or a combination thereof. For example, resource management platform 300 can use NFC 318 to add or provision additional resources that can be accessed and managed by resource manager 320. As such, a new resource can be placed in close proximity to resource management platform 300 and provisioning information can be read using NFC 318. Provisioning information of the additional resource can then be used as needed. For example, provisioning information can include communication profile information, device identifiers, or various other types of information that can be used to provision an additional resource. In some aspects, resource management platform 300 can access another resource, such as a local resource and/or cloud resource to download information using data read from an NFC device of the additional resource. In another aspect, information read from the NFC device can include an encoded URL, credentials, or various other types of information to enable resource management platform 300 to access provisioning information. As such, resource management platform 300 can provision additional resources using hosted or cloud-based provisioning information.

According to a further aspect, NFC device 318 can be scanned by a third party NFC reader interested in resource management platform 300. For example, model information, website information, mobile application, advertisement information, pricing information, a review site capable of providing reviews about resource management platform 300, or any combination of resource information can be encoded within NFC device and communicated to a device after installed at a site.

According to another aspect, NFC device 318 can include encoded logic, such as a software program, a driver, or other type of logic, that can be communicated to memory 310 and used by resource management platform 300. According to another aspect, NFC 318 can be used as a passive device and read by a separate reader. For example, a mobile device (not show), remote control or wand, tablet device, and the like can include an NFC reader capable of reading information stored within NFC device 318. As such, resource management platform 300 can be identified and provisioned using an external resource during installation or activation. For example, power need not be applied to resource management platform 300 as NFC device 318 can be powered using an external NFC reader. For example, a mobile device may include an NFC reader that can be accessed by an application being used by the mobile device. Upon reading contents within NFC 318, resource management platform 300 can be added to the mobile application and managed accordingly. For example, profile information specific to resource management platform 300 can be communicated to a mobile device and paired to the mobile device. In this manner, a user need not enter an authentication code, pairing code, or other information to authenticate the relationship during provisioning of resource management platform 300. Additionally, a mobile device having a reader may be able to communicate information to NFC device 318 and store information within NFC device 318. For example, mobile device may include resource information about other resources associated with the mobile app and a site, and in some instance may be able to provide network credentials to allow resource management platform 300 to join a network when power is applied to resource management platform 300. As such, a memory device of NFC device 318 can be updated to include resource information and communicated using an interface 312 and bus 320 when power is applied to resource management platform 300.

According to a further aspect, resource management platform 300 can communicate with an external information network to receive and store a plurality of data files in memory 310. For example, any combination of data files, video files, music files, weather forecasts, sports scores, informational or instructional videos, advertisements, current news or any other information received from a plurality of sources accessible to resource management platform 300.

According to further aspect, resource management platform 300 can be used to manage energy use at a site. For example, thermostat control can be incorporated into resource management platform 300 to control a HVAC unit disposed at the site. In addition, resource management platform 300 can be configured to convert an incoming message received from a wireless energy network (not expressly illustrated in FIG. 3) into XML enabled output data. Processor 302 can also format an outgoing message to be output to a wireless energy network using XML enabled input data. According to an aspect, XML enabled input data can include resource information such as a network device identifier of a network device accessible using a wireless energy network.

According to another aspect, resource management platform 300 can access resource information, such as a network device profile and use the network device profile to output a message receivable by a specific resource or network device. For example, network device data can be formatted using a network device profile of a specific network type of the wireless energy network. In some forms, a network device profile may not include information sufficient to output network device data.

As such, profile modifiers can be provided and can include profile modification data of the resource. Resource management platform 300 can be used to access, create and manage operating conditions, home profiles, user profiles, device profiles, user schedules, proximity detection, demand response preferences, energy savings preferences, other control settings, view data files sent from the customer engagement platform, or any combination thereof. Other settings and operating conditions can be accessed, monitored, or managed as needed or desired.

According to an aspect, resource management platform 300 can be configured to output video using a pico projector and speakers. For example, a user can select video content to be output using a mobile device or other resource. Resource management platform 300 can initiate outputting the video content using a pico projector onto a screen, wall, or other surface as desired. In this manner, if a user desired to output a stored video, streamed video, and the like, a user may select and output video. For example, resource management platform 300 can be configured to include a wired or wireless microphone for input and a user may select a karaoke video stored on YouTube® or other source. As such, a pico projector can display the video and a user can sing along as desired. In this manner, a video karaoke machine can be realized by resource management platform 300. According to a further aspect, a touch pad can be provided and a touch controller and pointer can be displayed using a pico projector. In this manner, a GUI can be output by a pico projector and selection of content can be done using the touch pad and display output by a pico projector.

Figure 4:
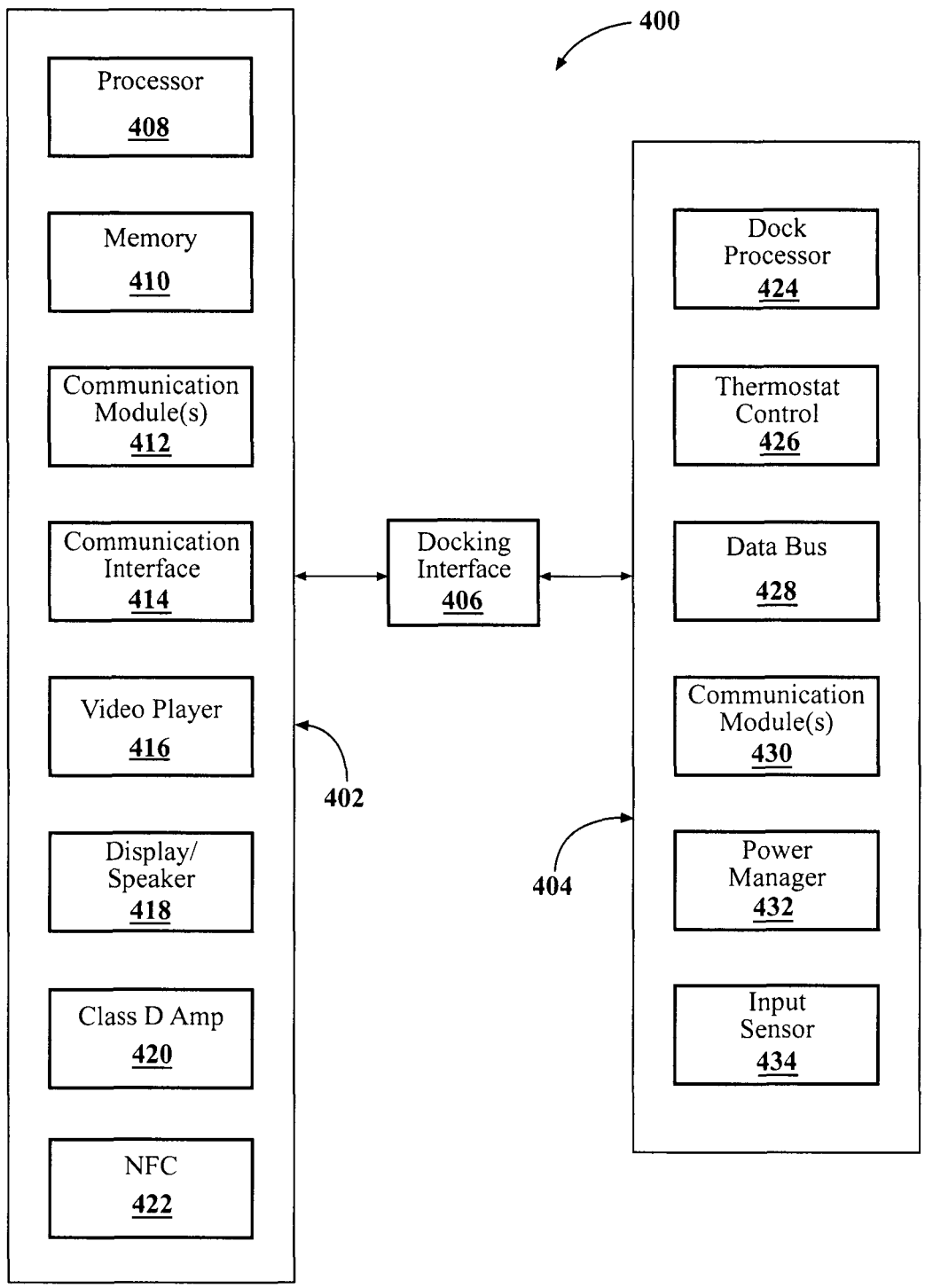
FIG. 4 illustrates a block diagram of a resource management platform configured to manage a media resource and a smart energy resource according to an aspect of the disclosure.

FIG. 4 illustrates a block diagram of a resource management platform configured to manage a media resource and a smart energy resource according to an aspect of the disclosure. According to an aspect, a resource management platform 400 can be provided as a resource, a network device, a portal, a customer engagement portal, an energy management system, an environment management system, a resource manager, or any combination thereof and can be realized as a system, a controller, a network device or any combination thereof capable of deploying portions or all of resource management platform 300 illustrated in FIG. 3 and operable to use resource information to manage a resource. Resource management platform 400 can be provided as a resource manager, a resource to be managed, or a combination of both.

According to a further aspect, resource management platform 400 includes a media center 402 configurable to be coupled to a docking station 404 using a docking interface 406. Docking interface 406 can be used to provide communication between media center 402 and docking station 404 and according to an aspect, can use a serial, parallel, or various other combinations of communication. According to an aspect, docking interface 406 can use high level data link control (HDLC) in normal response mode (NRM) or a connectionless communication protocol to communicate information between the media center 402 and the docking station 404. An XON-XOFF asynchronous flow control can be used between the media center 402 and docking station 404 at the physical layer of the communication stack. Through the use of HDLC-NRM mode, a reduction in noise can be realized resulting in reliable data communication between media center 402 and docking station 404. Other control protocols can also be used as needed or desired.

According to an aspect, media center 402 can include a resource management platform and docking station 404 that can include a thermostat configured to control a remote unit such as the HVAC unit, a heat pump, other appliances, resources, or any combination thereof. According to an aspect, media center 402 can include a processor 408, a memory 410, one or more communication devices 412, one or more interfaces 414, a video player 416, a display and speakers 418, a sound amplifier such as a Class D Amp 420 and an NFC 422. According to an aspect, display 418 can include a pico projector capable of displaying information on a wall near resource management platform 400. According to an aspect, resource management platform 400 can include docking station 404 which can include a dock processor 424, a thermostat control 426, a data bus 428, docking station communication devices 430, a power manager 432, and one or more input sensors 434.

According to an aspect, resource management platform 400 can be capable of streaming music from within the site while providing comfort control and allows for the enjoyment of an iTunes® or other music library at resource management platform 400. In some aspects, media center 402 can be provided as a mobile unit, and thus the integration of AirPlay® allows for easy enjoyment of the music library in any location or room of the site at any given time. Incorporating this technology further increases the multimedia capability of resource management platform 400 and increases the utility of the unit. As previously mentioned, media center 402 can be docked with docking station 404 and output music at a specific thermostat control installation site.

In another aspect, media can be preloaded and stored in memory 410. For example, media can include instructional videos regarding the appropriate ways to use the thermostat for achieving proper use and educating a user with regard to the most efficient operation. This is advantageous because it allows a user to access the instructional video at an appropriate time while also improving the communication between third parties, utility providers and customers which can leads to improved energy management and good will.

Figure 5A:
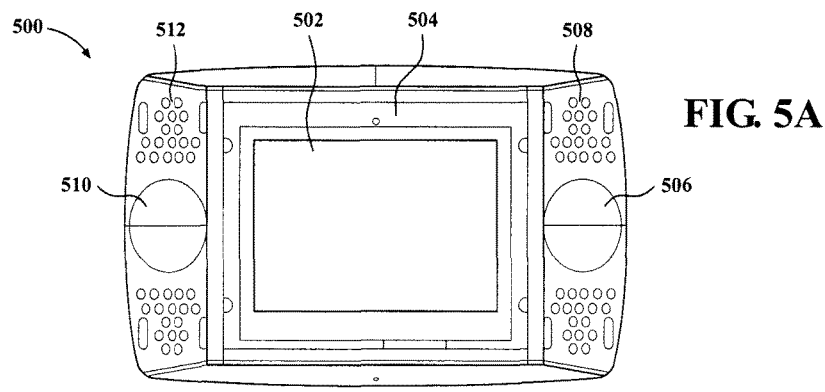
FIG. 5A illustrates a front view of a media resource according to an aspect of the disclosure.
Figure 5B:
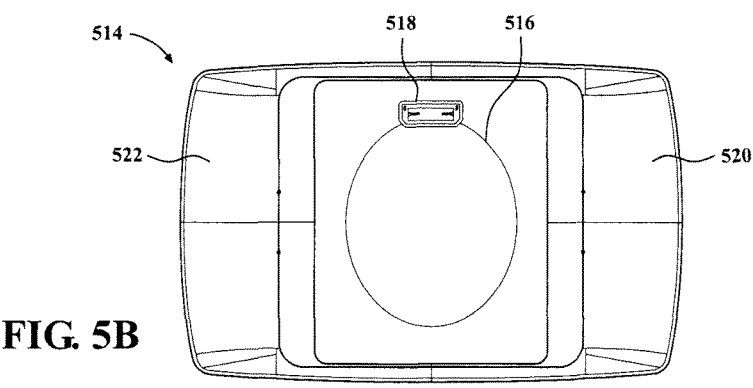
FIG. 5B illustrates a rear view of a media resource according to an aspect of the disclosure.
Figure 5C:
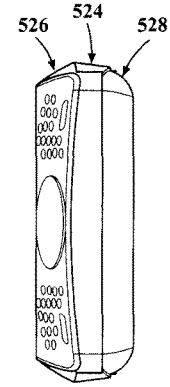
FIG. 5C illustrates a side view of a media resource according to an aspect of the disclosure

FIG. 5 illustrates a diagram of views of a resource management platform according to an aspect of the disclosure. A resource management platform, illustrated generally at 500, can include a display screen 502 such as a resistive or capacitive touch LCD, a light sensor 504 and speakers 506, 510. Resource management platform 500 can also include speaker covers 508, 512 covering speakers 506, 510 respectively. Resource management platform 500 can be configured as a media center such as media center 402 generally described in FIG. 4.

According to an aspect, a rear view 514 of resource management platform 500 illustrates a rear cavity 516 and docking interface 518 operable to be coupled to a docking station, such as docking station 630 described in FIG. 6 below. Resource management platform 500 also includes a sound chamber 520, 522 sized to enhance sound quality of speakers 506, 510. A side view 524 of resource management platform 500 illustrates a front housing 526 coupled to a rear housing 528.

Figure 6A:
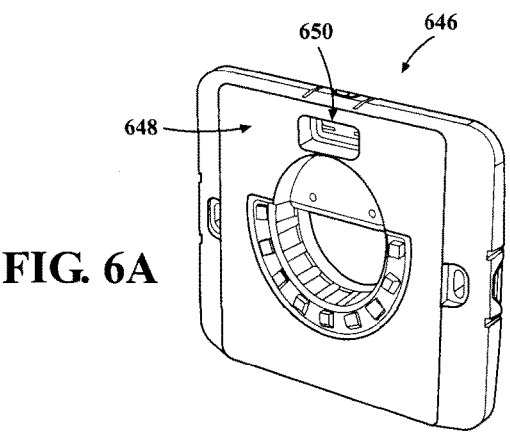
FIG. 6A illustrates a perspective view of a docking resource according to an aspect of the disclosure.
Figure 6B:
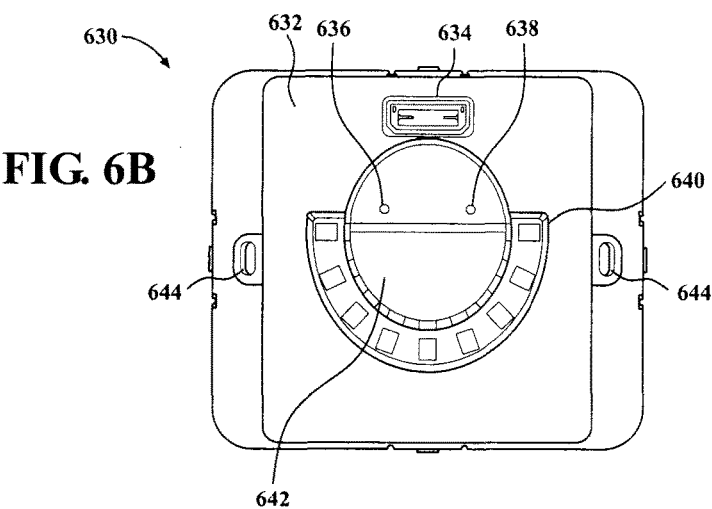
FIG. 6B illustrates a front view of a docking resource according to an aspect of the disclosure.
Figure 6C:
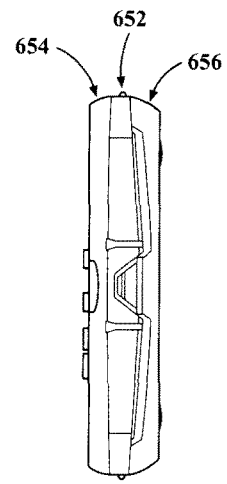
FIG. 6C illustrates a side view of a docking resource according to an aspect of the disclosure.

FIG. 6 illustrates a diagram of views of a docking resource according to an aspect of the disclosure. Docking station 630 can include a front surface having a docking interface receptacle 634 operable to be coupled to docking interface 518 of FIG. 5. Docking station 630 can be configured as a thermostat enabled docking station such as docking station 404 generally described in FIG. 4. Docking station 630 can also include a thermostat adjuster 636, a reset button 638, and a terminal block 640. According to an aspect, terminal block 640 can be configured as described in Applicant's concurrently filed U.S. patent application Ser. No. 13/600,111, entitled "Terminal Connector for a Wall Mounted Device" and filed on Aug. 30, 2012, now U.S. Pat. No. 8,748,745 which is herein incorporated by reference. Docking station 630 also include an aperture 642 configured to allow access to thermostat wiring (not expressly illustrated). An angled view 646 of docking station 630 illustrates docking station cavity 650 and front housing 648 configured to be inserted into cavity 516 of resource management platform 500. A side view 653 illustrated a front cover 652 and rear cover 656 of docking station 630.

During use, docking station 630 can be mounted to a wall using mounting holes 644 and screws with anchors as needed (not expressly shown). Terminal block 640 can be connected to an environment control resource such as an HVAC system. Various types of environment control resources can be supported including, but not limited to, heat pumps, conventional, electric, gas, oil, propane, geothermal, or various other types of resources that can include single or multiple stage capabilities. According to an aspect, an HVAC system or similar resource can be used to provide 24 VAC to docking station 630. Resource management platform 500 can be docked to docking station 630, and capable of receiving power using docking interface receptacle 634. According to an aspect, docking interface receptacle 634 can provide power and can further connect one or more data buses, control lines, and various other types of interfaces that can be used between docking station 630 and resource management platform 500.

According to a further aspect, upon providing power to resource management platform 500, docking station 630 when connected to an environmental control system resource can be used to control temperature set-points, operating modes, and the like. As such, resource management platform 500 need not be connected to docking station 630 to control an environmental control system resource. According to another aspect, docking station 630 can provide power to resource management platform 500 to charge a rechargeable battery housed within resource management platform 630 (not expressly illustrated). As such, resource management platform 500 can be removed from docking station 630 and used as a portable resource management platform.

According to another aspect, docking station 630 can be used to dock more than one type of unit. For example, a lower cost and fewer feature set unit (not expressly illustrated) can be used to control or display operating information of an environmental control system or other type of system docking station 630 may engage. As such a lower cost resource management platform 500 can be provided. In other forms, docking station 630 can include portions or all of resource management platform's 500 functionality. According to a further aspect, a cover (not expressly illustrated) can be coupled to docking interface receptacle and used to cover docking station 630. According to one aspect, multiple decorative types of covers can be used to cover docking station 630. Additionally, docking station 630 can include a communication module capable of being accessed to alter an operating condition of docking station 630. In this manner, a user need not access docking station 630 to alter an operating condition and can use remote resources, such as mobile devices, tablets, computers, web interfaces, and the like, to alter an operating condition of docking station 630.

According to a further aspect, resource management platform 500 can include multi-media output capabilities. For example, display 502 can output pictures, animated graphics, video and the like. Speakers 506, 510 can be used to output audio associated with video being played and in some aspects, can be used to output music stored locally, remotely accessed, streamed music from local sources, cloud based sources, or any combination thereof. According to a further aspect, when music only is being played by resource management platform 500, screen 502 can be dimmed or a backlight of screen 502 can be turned off to allow for reduced energy consumption. Screen 502 and speakers 506, 510 allow for improved customer engagement through the use of multi-media rich videos, such as energy tips, video tutorials, animated weather, and various other forms of rich multi-media. According to another aspect, resource management platform 500 can output media while providing environmental control of an environment control resource.

According to another aspect, resource management platform 500 can be used to manage video content that may be output using display 502 or other resources accessible to resource management platform 500. For example, when a new energy tip or other type of information video may be available for a user to view, resource management platform 500 can provide an indicator, such as graphic indicator that may be animated, to indicate that a new video may be available. Upon a user viewing a new video, resource management platform 500 can remove the indicator as needed or desired. As such, content and use thereof can be managed by resource management platform 500.

According to a further aspect, resource management platform 500 can include a custom graphical user interface environment to display information, access applications, output applications, provide interaction, and the like. For example, custom animations can include two and three dimensional animation effects to increase a user's experience. According to an aspect, resource management platform 500 can use custom animated graphics and sound to create a rich environment to engage consumers and users.

According to another aspect, resource management platform 500 can be used to provide multiple language support. For example, resource management platform 500 may allow for selection of a specific language to be used. According to other forms, selection of a language can be provided using another resource, such as a mobile device, tablet, computer, web interface, or other resource. Upon a user selecting a language, resource management platform 500 can update a language profile and output the selected language as needed. In other forms, a user may also select units to be output as well, including, but not limited to outputting temperature in degrees of Fahrenheit or Celsius. Other settings can also be selected and shared using resource management platform 500.

According to an aspect, resource management platform 500 can also include a sound manager capable of providing equalizer capabilities. For example, resource management platform 500 can include preset audio output levels to account for different installation locations at a site. For example, if a unit is installed in a hallway, a user may be able to select an acoustical preset that would output audio that is optimized for a hallway. Various other types of presets can also be provided including, game rooms, living rooms, kitchen, bedroom, rooms with carpet, tile, wood flooring, or various other aspects of a room that can affect sound quality. A user may be able to select a room type using resource management platform 500, a mobile device, tablet, web interface, or any combination thereof.

According to another aspect, resource management platform 500 can also provide additional equalizing, independent of, or in addition to, room-based equalizing. For example, resource management platform 500 may be able to read meta data of content to be output and can alter an equalizer setting based on the type or genre of media to be output. For example, if a jazz-based song is to output, a jazz enhanced equalization can be selected by resource management platform and input into a DSP used to process music. Various other genres can also be supported and used as needed or desired. In other forms, video content can also be output using enhanced equalization performed using meta data. For example, a video that is created to capture someone's attention may require a different equalization than a tutorial video. In other forms, music videos accessed using YouTube, a local resources, or various other video sources can include meta data to alter an equalization output.

According to a further aspect, resource management platform 500 can include one or more microphones. For example, resource management platform 500 can include one or more integrated microphones that can be used during a set-up of resource management platform to determine acoustic qualities of an installation location. Sound tones can be output by resource management platform 500 and audio output levels for each speaker, equalization levels, or various other sound management techniques or enhancements can be optimized using a microphone.

According to a further aspect, resource management platform 500 can include intercom capabilities using a microphone (not expressly illustrated). For example, a user may be able to speak into a microphone and further select an end device or resource to output a selected voice message in real time. For example, a unit that may be installed upstairs may be used to select a downstairs unit located in a kitchen or other location. As such, a user can communicate with another individual in a separate part of a building. In other forms, a video camera (not expressly illustrated) may also be provided with resource management platform 500 and can be used to capture and output streaming video to another resource to provide a video intercom device as a part of platform 500. According to a further aspect, using a video camera, resource management platform 500 can be used as a video phone and can deploy video phone capabilities and/or can be used to support third party video phone applications such as Skype, Facetime, and the like. In this manner, video phone and/or intercom capabilities can be deployed and used to communicate with units within a site, and also units or resources that may be installed at another location. For example, an intercom application can be used with PUB-SUB communication to enhance communication between devices that may be selected or activated using PUB-SUB and chat room capabilities.

Figure 7:
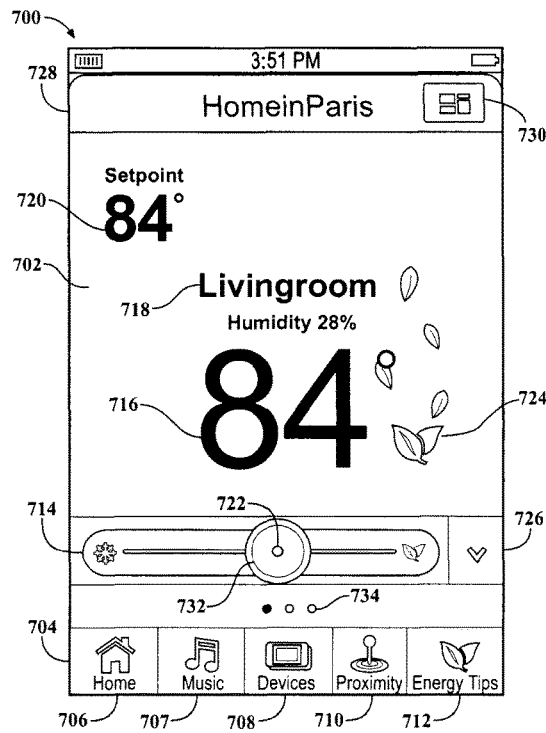
FIG. 7 illustrates a block diagram of a user interface configured to display resource information and input selectors according to an aspect of the disclosure.

FIG. 7 illustrates block diagram of a user interface configured to display resource information and input selectors according to an aspect of the disclosure. A user interface 700, can be deployed using a mobile device, laptop or desktop computer, tablet PC, monitor, display, television, active display surface, appliance, or any device, system, or combination thereof capable of providing user interface 700. Portions or all of user interface 700 can also be provided as a stand alone interface or application, an Internet or Browser based interface or application, or any combination thereof. User interface 700 can be used to display various types of resource information, including, but not limited to providing an environment management user interface and settings that can be used to display information, environment settings or various other types of settings and information or any combination thereof.

According to an aspect, user interface 700 can include a main display section 702 and a navigation menu 704. Navigation menu 704 can include a home button 706, a music button 707, a device button 708, a proximity button 710, and an energy tips button 712. Additional buttons can be added to navigation menu 704 and an associated user interface as needed or desired. User interface 700 can also include a temperature or comfort settings slider region 714 and a current readings 716 of a location or zone of a resource. A current set-point 720 can also be displayed. User interface 700 can also include an animation 724 that is configured to engage a user and provide a user feedback on how a resource is currently being managed. For example, animation 724 can include green leaves flowing from bottom to top that may increase in height as a user conserves energy through setting comfort settings slider 714 to a conservation based setting. According to another aspect, slider region 714 can include button 732 having a lit region 722 that alters in color as button is moved along slider region 714. For example, as button 732 moves to the left or towards a cooler temperature, lit region 722 can display a cooler color temperature gradient. Similarly, as button 732 may be moved right, lit region 722 can alter a color and display a green colored gradient as slider is moved towards a conservation setting. In this manner, a user of user interface 700 may be engaged through interactions with user interface 700.

According to a further aspect, user interface 700 can include a settings selector 726 that can be selected to access specific settings of a resource being displayed within main display section 702. User interface 700 can also include a navigation bar 728 indicating a current resource or site being managed, and a site management button 730 configured to provide a user access to another site or location having resources. According to an aspect, site management button 730 can also be used to manage resources at a single site when multiple sites may not be managed. According to a further aspect, a user can navigate to additional resources by swiping or providing a gesture to main display section 702, ellipsis 734 can be updated to display which resource information may be currently displayed within main display section 702. According to an aspect, as a different resource may be displayed, various information, comfort settings, management resources, of a resource can be displayed by user interface 700 as needed or desired.

According to an aspect, as a user slides button 732, current readings 716 can transition off or out of main display section 702 and current set-point 720 can replace current readings 716. A value of current set-point 720 can be increased and decreased as a user slides button 732. As a user stops moving button 732, the new value of current set-point 720 will transition back to upper portion of main display section 702 and current readings 716 can be displayed and updated as needed.

Figure 8:
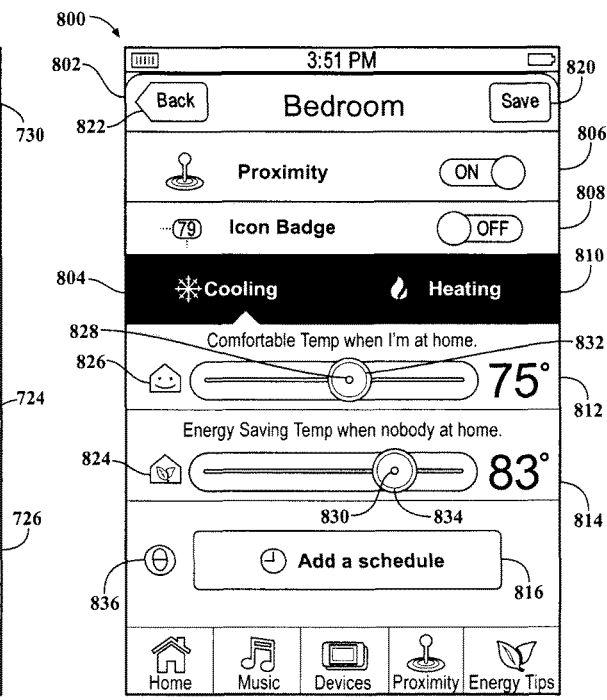
FIG. 8 illustrates a block diagram of a user interface configured to display resource information and input selectors according to an aspect of the disclosure.

FIG. 8 illustrates a block diagram of a user interface configured to display resource information and input selectors according to an aspect of the disclosure. A user interface 800 can be deployed using a mobile device, laptop or desktop computer, tablet PC, monitor, display, television, active display surface, appliance, or any device, system, or combination thereof capable of providing user interface 800. Portions or all of user interface 800 can also be provided as a standalone interface or application, an Internet or Browser based interface or application, or any combination thereof. User interface 800 can be used to display various types of resource information, including, but not limited to providing an environment management user interface and settings that can be used to display information, environment settings or various other types of settings and information or any combination thereof.

According to an aspect, user interface 800 can include navigation section 802 capable of displaying a current resource, location of a resource, or any combination of information that can be used to identify a resource. User interface can also include a main display section 804. User interface 800 can be used to modify general settings of a resource or site. As illustrated, user interface 800 can include a proximity setting 806, an icon badge setting 808, a mode setting, a comfort setting 812, an energy savings setting 814, and a schedule button 816 operable to enable a user to create a schedule to operate an associated resource. According to another aspect, user interface 800 can be used to create a schedule using a voice command and voice command button 836. For example, a user can select voice command button 836, and user interface 800 can enable voice command logic capable of initiating processing of a voice command. According to an aspect, a voice processing cloud service can be accessed, such as Nuance or others, and can be used with user interface 800. For example, upon selecting voice command button 836, a voice prompt can say "would you like to add a schedule?". A user can respond by saying "Yes". A voice response of the user interface can include "Please say the start time", "Please say the end time", "Please say the temperature", or various other responses as a user provides vocal information about settings for a resource. Various other voice commands and responses can be generated on a resource-by-resource basis and a schedule for a resource can created, modified, and deleted as needed or desired. Additionally, a graphical schedule can be created and updated automatically as a user provides a voice control scheduling input. Upon a schedule being created, portions or all of a schedule can be communicated to a resource, resource manager, or any combination thereof to manage a resource.

According to an aspect, user interface 800 can also include a save button 820 to save changes, and a back button 822 to navigate back to previous screen. User interface 800 can also include a energy saving icon 824 and a comfort icon 826, a comfort slider button 828 and comfort slider lite 828, a energy savings slider button 834 and energy slider lite 830.

During operation, a user can set a comfort temperature using comfort slider button 832 to a desired temperature when a user arrives home. Additionally, a user can set an energy saving temperature using energy saving slider button 834 to a warmer temperature to increase energy savings. For example, a user may desire a temperature to increase five degrees when not at home. According to an aspect, as a user provides a temperature that provides increased savings, energy savings icon 824 can be altered to indicate greater savings are being achieved. In this manner, a user engagement can be created by providing a visual feedback to a user when providing settings.

According to a further aspect, proximity setting 806 can be enabled or disabled as desired. For example, when enabled, location based services can be used to alter an operating condition of a resource. According to a further aspect, if a user enables icon badge switch 808, an application icon can be updated to display a current operating condition of a resource (e.g. temperature, sound on/off, lights on/off, door open/closed, etc.). According to another aspect, an icon badge can include updating a social media status, updating a widget or other element displayed on another device, or various other methods or combinations of methods of displaying an operating status using a badge.

FIG. 9 illustrates a block diagram of a user interface 900 configured to display resource information and input selectors according to an aspect of the disclosure. A user interface 900 can be deployed using a mobile device, laptop or desktop computer, tablet PC, monitor, display, television, active display surface, appliance, or any device, system, or combination thereof capable of providing user interface 900. Portions or all of user interface 900 can also be provided as a stand alone interface or application, an Internet or Browser based interface or application, or any combination thereof capable of providing user interface 900. Portions or all of user interface 900 can be used to display various types of resource information, including, but not limited to providing an environment management user interface and settings that can be used to display information, environment settings or various other types of settings and information or any combination thereof.

According to an aspect, user interface 900 can include a proximity button 902 that can be selected to provide user interface 900. User interface 900 can include a main display section 904, a map frame 906 configured to display a map 916. User interface 900 can also include a set location button 908, a site location pin 910 and associated zones. User interface 900 can also include a distance slider 912 and distance slider button 914 configured to display a distance above a button. As a user selects a travel distance using distance slider button 914, a new travel distance can be displayed above distance slider button 914 as it moves. Additionally, map 916 within map frame 906 can be magnified or de-magnified based on the travel distance selected using distance slider button 914. Additionally, site location pin 910 and associated zones can be scaled and moved accordingly. For example, as a greater travel distance may be selected, map 916 can be zoomed out or de-magnified, location pin can be moved, and associated zones can be made smaller. According to a further aspect, a current location 918 can also be displayed. In another form, site location pin 910 can include a badge or call out box to display one or more current operating conditions at a site (not expressly illustrated). According to an aspect, a badge or call out box can be selected to access resource information and setting of a resource being displayed.

FIG. 10 illustrates a block diagram of a user interface configured to display resource information and input selectors according to an aspect of the disclosure. A user interface 1000, can be deployed using a mobile device, laptop or desktop computer, tablet PC, monitor, display, television, active display surface, appliance, or any device, system, or combination thereof capable of providing user interface 1000. Portions or all of user interface 1000 can also be provided as a standalone interface or application, an Internet or Browser based interface or application, or any combination thereof. User interface 1000 can be used to display various types of resource information, including, but not limited to providing an environment management user interface and settings that can be used to display information, environment settings or various other types of settings and information or any combination thereof.

According to an aspect, user interface 1000 can include a music button 1002 that can be selected to provide user interface 1000. User interface 1000 can include a main display section 1004, a media controller 1006 which includes a play and pause button 1008 which can be provided as a two state button to play and pause music. A current album cover can also be displayed within play and pause button 1008, and in some aspects, an actual control may be displayed when a central portion of play and pause button 1008 may be selected. According to a further aspect, when a current album cover section may be selected, user interface 1000 can display a list of songs available for that album (not expressly illustrated).

According to an aspect, user interface 1000 can also include a sound level selector 1010 to alter an output level of a resource playing music, and a back button 1012 to return to a previous song, and a skip button 1006 to skip a song and play the next song. User interface 1000 also includes a zone selector including a bedroom zone 1016, a living room zone 1018, and a dining room zone 1020. Other zones may be added or deleted as needed or desired. When selected, a zone may be highlighted, and a user can enable or disable outputting music to a resource. For example, a user can alter a first level in bedroom zone 1016 to play a low level, have a higher level being output in living room zone 1018, and have an output muted in dining room zone 1020. Various other combinations can also be provided.

According to a further aspect, user interface 1000 can include a source selector 1020 configured to enable selecting a media source to provide music. For example, upon selecting source selector, a list of available resources capable of providing media that can be controlled using user interface 1000 can be displayed. For example, user interface 1000 can display resources, located either locally or remotely including any combination of computer, iPad or tablet, mobile device, music server, cloud services, home stereos, speakers, theatre systems, game systems, or various other types of resources capable of providing media. According to an aspect, media resources that may be displayed can be compliant with one or more protocols, such as AiPlay, DLNA, UPNP, or various other types of protocols.

According to an aspect, a resource using user interface 1000 can be provided as any combination of a controller to control media of a remote resource configured to output media. In this regard, user interface 1000 can be used to select a source and destination, and manage or initiate establishing a relationship between each. For example, a user may select a source using source selector button 1026, and can further select a destination to play media, such as bedroom 1016. According to a further aspect, user interface 1000 can be used to enable access to locally stored music. As such, locally stored media can be sent to a destination, such as living room 1018. Each zone may have a different source, and in some instances the same source as needed or desired.

According to a further aspect, locally stored media content may not be immediately available, or may not be directly accessible to user interface 1000. However, user interface 1000 may allow for selection upon a playlist or listing of music being virtualized by a resource. For example, bedroom zone 1016 may include a resource manager (not expressly shown) that can access a library of the locally stored media. Meta data, cover art, photos, video frames, and other identifying information can be requested by resource manager. Upon receiving one or more references, available playlists or listings of media, resource manager can send the playlist or list to user interface 1000. In this manner, if a music player may not be able to be immediately accessed by user interface 1000, a resource manager can provide playlists and associated information to enable access.

According to an aspect, user interface can include a list view button 1022 capable of providing a listing of music that can be selected to play. According to another aspect, list view can also be used to display multiple playlists that may be available from a single source, multiple sources, or any combination thereof.

According to a further aspect, user interface 1000 can include a voice command button 1024. Voice command button 1024 can be used to control various aspects of user interface 1000 and associated resources. For example, a user can request to alter a zone where music is playing, alter a sound level, alter an equalization being applied (e.g. bass, treble, custom levels, and others), alter speaker balance, or various other aspects of managing music. According to a further aspect, a user can request a song or artist to be played. For example, a user can request to play "Born to Run" by Bruce Springsteen. The voice command can be processed and one or more resources or music libraries can be searched to determine if the track may be available. If the track is available, user interface 1000 can be updated to begin playing. However, in other forms, if a track is unavailable, user interface 1000, through graphics and/or audio output of voice control, can return an option to purchase the track (e.g. purchase from iTunes), and can navigate to a source to acquire the track. In other forms, if a track may not be available, user interface 1000 through graphics and/or audio output of voice control can provide a list of cloud services capable of providing a free version, or paid version of a streaming music. Upon selecting a source to provide the track, user interface 1000 can initiate output of the media.

According to a further aspect, a user may use voice command button 1024 to access other types of media that can be played. For example, a user may want to view a YouTube® video of a song that was recorded. As such, a user can request to have a YouTube® video downloaded to a resource. For example, user interface 1000 can receive text version of the request encoded from a voice command, and a resource can initiate a search at YouTube® for the requested song. Search results and encoded links to videos of the requested song can be provided to a user using user interface 1000, and in other forms search results can be returned and processed automatically to initiate outputting or streaming a video. According to another aspect, a user can select the next track button 1014 to initiate viewing the next video provided in the search results.

Although illustrated as a user interface to manage music, user interface 1000 can be used and manage with other forms of media such as streaming music, streaming video, streaming photos, locally stored media, cloud stored media, or various other forms of media as needed or desired.

Figure 11:
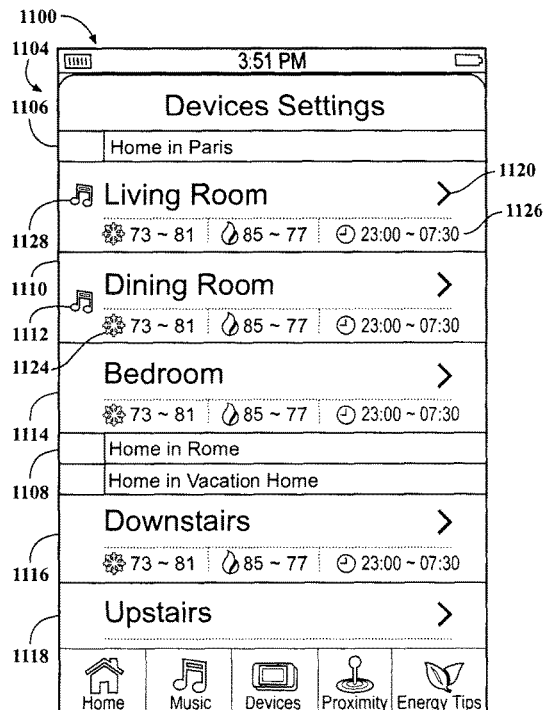
FIG. 11 illustrates a block diagram of a user interface configured to display resource information and input selectors according to an aspect of the disclosure.

FIG. 11 illustrates a block diagram of a user interface 1100 configured to display resource information and input selectors according to an aspect of the disclosure. A user interface 1100, can be deployed using a mobile device, laptop or desktop computer, tablet PC, monitor, display, television, active display surface, appliance, or any device, system, or combination thereof capable of providing user interface 1100. Portions or all of user interface 1100 can also be provided as a standalone interface or application, an Internet or Browser based interface or application, or any combination thereof capable of providing user interface 1100. User interface 1100 can be used to display various types of resource information, including, but not limited to providing an environment management user interface and settings that can be used to display information, environment settings or various other types of settings and information or any combination thereof.

According to an aspect, a devices button 1102 that can be provided that can be selected to provide user interface 1100, as shown in FIG. 11. User interface 1100 can include a main display section 1104, capable of providing a list view of resources and locations currently being managed. For example, user interface 1100 can display resources at a home in Paris 1106 and resources at a home in a Vacation Home 1108. Paris Home 1106 can include a living room resource 1110, a dining room resource 1112, and a bedroom resource 1114. According to an aspect, Vacation Home 1108 can include a downstairs resource 1116 and an upstairs resource 1118. Various combinations of resources can be used at either location as needed or desired. Additionally, each resource can include portions, none, or all of a resource manager or resource management platform as described herein.

According to a further aspect, one or more resources can include media output capabilities such as playing video, streaming music, outputting photos, or various other media output capabilities. As such, user interface 1100 can provide an icon to indicate a resources capabilities and status if desired. For example, living room resource 1110 can include a music output icon 1128 to indicate a music player and output capabilities, a comfort icon 1124 to indicate comfort settings or temperature settings resource, and a scheduling resource 1126 to enable scheduling use of living room resource 1110. A user can further select a resource to view and manage by selecting arrow button 1120 of a desired resource. For example, upon selecting arrow 1120, a user interface similar to user interface 800 of FIG. 8 can be displayed. In other forms, a user may select a music output icon 1128 and a user interface similar to user interface 1000 can be displayed. Other user interfaces can also be provided as needed or desired.

According to an aspect, user interface 1100 can be used with a publish-subscribe (PUB-SUB) communication infrastructure to enable various types of communication such as chat rooms, instant messaging, and the like among resources. As such, a PUB-SUB communication resource can be accessed to communicate information between any combination or number of resources. A PUB-SUB resource allows for efficient communication of information without having to rely on a polling method of communication. For example, living room resource 1110 host PUB-SUB resources and enable a virtual chat room to allow resources to communicate with each other, and user interface 1100 can join the chat room and obtain information about resources. As such, user interface 1100 can publish information, such as XML encoded data, media content and references, resource management information, media management information, energy management information, and various other types of information that can be used to manage a resource in near real-time due to the nature and performance of instant messaging and PUB-SUB technology.

Figure 12:
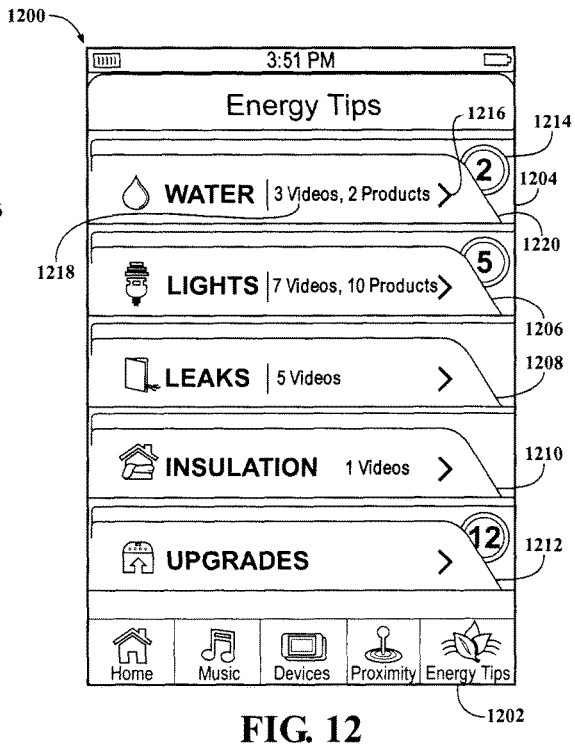
FIG. 12 illustrates a block diagram of a user interface configured to display resource information and input selectors according to an aspect of the disclosure.

FIG. 12 illustrates a block diagram of a user interface configured to display resource information and input selectors according to an aspect of the disclosure. A user interface 1200, can be deployed using a mobile device, laptop or desktop computer, tablet PC, monitor, display, television, active display surface, appliance, or any device, system, or combination thereof capable of providing user interface 1200. Portions or all of user interface 1200 can also be provided as a standalone interface or application, an Internet or Browser based interface or application, or any combination thereof. User interface 1200 can be used to display various types of resource information, including, but not limited to providing an environment management user interface and settings that can be used to display information, environment settings or various other types of settings and information or any combination thereof.

According to an aspect, user interface 1200 can include a energy tips button 1202 that can be selected to provide user interface 1200. User interface 1200 can include a main display section 1204, displaying several categories of video tips that can be viewed on how to save energy and reduce costs. Videos can include basic tips and in some instances can include videos of new or existing products that can be purchased. For example, a list of products and links to purchase may be provided. In other instances, a link may be presented at an end of a video to learn more about a product and can be shared into a social network such as Facebook, LinkedIn, Pinterest, etc.

According to an aspect, user interface 1200 can include a water tip category 1220, a lights category 1206, a leaks category 1208, an insulation category 1210, an upgrades category 1212. User interface 1200 can also display a total number of videos and products section 1218, and an indicator 1214 to identify if there are any new videos or products, According to a further aspect, energy tips icon can include an animation, badge or other visual indicator to show that new tips or products may become available.

According to a further aspect, user interface 1200 can be used with video and product management services that can include various types of videos or customer engagement content to be communicated to user interface 1200. According to an aspect, an energy tip video can be generated in a specific region for a specific market or demographic. As such, the energy tip video can be communicated and displayed using user interface 1200. According to another aspect, an energy tip video can be communicated to a mobile device deploying user interface 1200 allowing a user to view the energy tip video in a mobile environment. As a user views an energy tip video, the tip can be stored, saved, deleted, shared into a social network, as desired. Although described as an energy tip video, various other types of videos can be created and managed. Additionally, if a user views a tip using a mobile device or other resource, indicator 1214 can be updated and animated icon 1202 can become non-animated as needed or desired. In this manner, a user may not have a tip or notification located in multiple places after viewing. For example, user interface 1200 can be linked to a chat room using PUB-SUB and can communicate a message indicating that a tip has been viewed. Each resource can then update their tip list as needed or desired.

Figure 13:
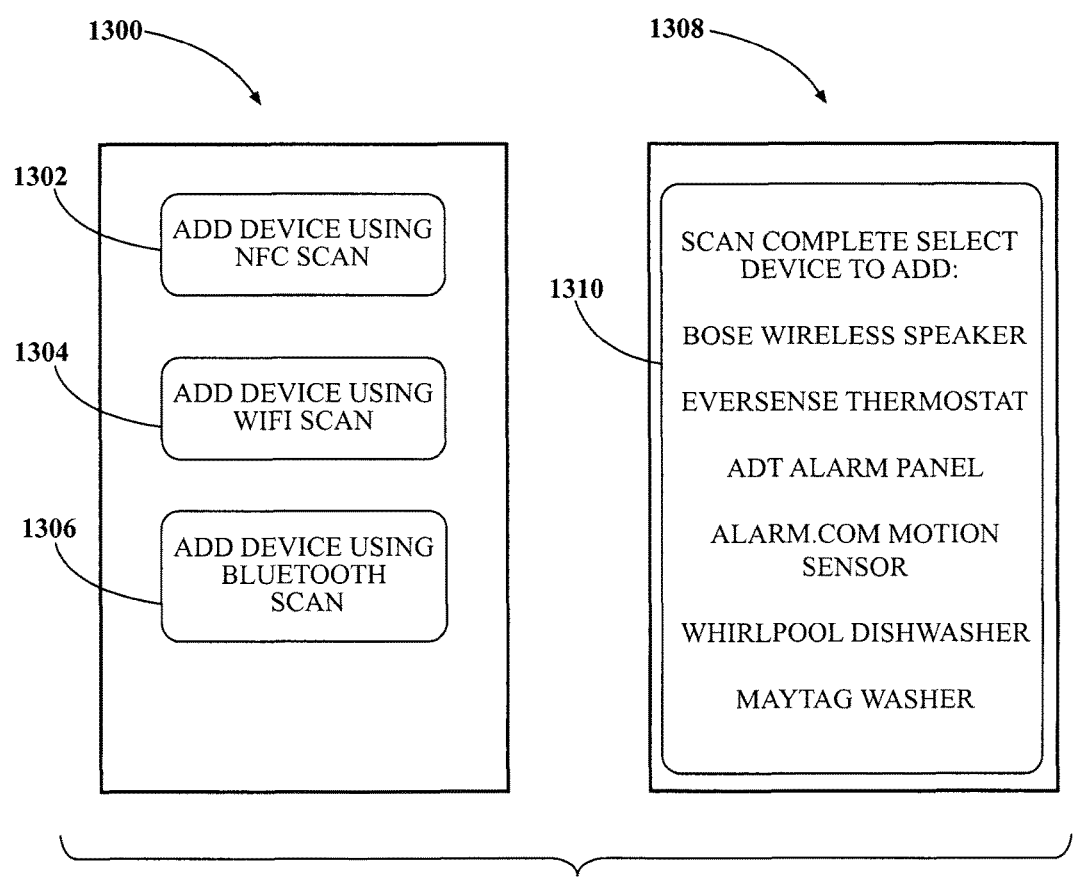
FIG. 13 illustrates a block diagram of a user interface configured to display resource information and input selectors according to an aspect of the disclosure.

FIG. 13 illustrates a block diagram of a user interface configured to provision a resource according to an aspect of the disclosure. A user interface 1300, can be deployed using a mobile device, laptop or desktop computer, tablet PC, monitor, display, television, active display surface, appliance, or any device, system, or combination thereof capable of providing user interface 1300. Portions or all of user interface 1300 can also be provided as a stand alone interface or application, an Internet or Browser based interface or application, or any combination thereof. User interface 1300 can be used to display various types of resource information, including, but not limited to providing an environment management user interface and settings that can be used to display information, environment settings or various other types of settings and information or any combination thereof.

According to an aspect, user interface 1300 can include several mode selectors to use to provision a new resource. For example, provisioning interface 1300 can include one or any combination of an NFC Scan selector 1302, a WiFi scan selector 1304, and a Bluetooth Scan selector 1306. Other scan techniques can also be provided. Additionally, provisioning interface 1300 may also be able to provide an option to scan using all available scan techniques. A located device list 1308 can be provided to a user. A user may then select one or more devices 1310 to provision or associate with the mobile device or site.

Although FIGS. 7-13 have been depicted as separate user interfaces, information presented therein can be combined as needed or desired and information, functionality, and presentation are not to be limited to a specific user interface and can be combined, removed, appended, changed or altered in whole, or in part, as needed or desired.

Figure 14:
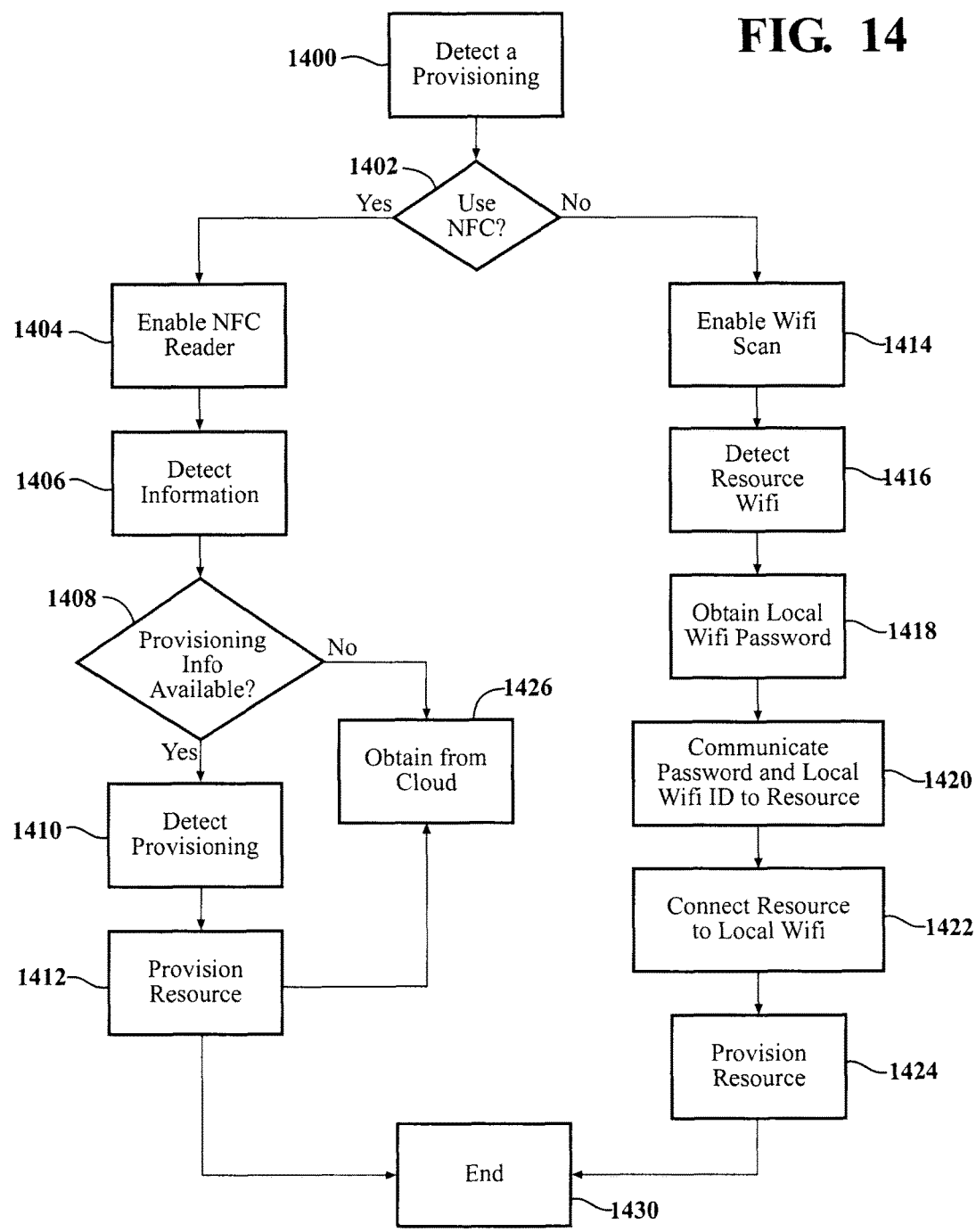
FIG. 14 illustrates a flow diagram of a method of provisioning a resource according to an aspect of the disclosure.

FIG. 14 illustrates a flow diagram of a method of provisioning a resource according to an aspect of the disclosure. The method can be used by portions or all of the systems, devices, applications, platforms, services, methods, or any other resource or combination thereof illustrated in FIGS. 1-13 and FIG. 15 and described herein. The method begins at block 1400 when a request to provision a resource may be detected. The method proceeds to decision block 1402 and detects whether to use NFC to provision a resource. If NFC can be used, the method proceeds to block 1404 and an NFC reader may be enabled. At block 1406, information is read from the NFC of the resource and at decision block 1408, the method determines whether provision information sufficient to provision the resource may be available. If it is available, the method proceeds to block 1410 and the resource may be provisioned. If at decision block 1408 provisioning information may not be sufficient or available, information read from the resource can be used to communicate with another location, such as a cloud service, to obtain information to provision a resource.

According to an aspect, provisioning a resource can include enabling a resource to be used at a site. For example, provisioning can include enabling a resource to join a local communication network, such as a WiFi or 802.11 based network. In other forms, provisioning can include enabling a resource to have access to one or more types of networks. For example, a resource may include a Z-Wave communication device. As such, an NFC can include a Z-Wave profile information, and credentials to enable a resource to be used at a site. In other forms, a combination of communication devices may be provided within a resource. As such, an NFC device can include credentials for multiple communication devices and may communicate information to enable management of the resource. According to another aspect, provisioning can include providing an NFC of the resource with a minimal amount of information, such as a unique I.D. of the resource or NFC. As such, the unique I.D. can be used to obtain additional information through access of a database, cloud service, or other information source capable of providing provisioning information using an I.D. obtained from an NFC device of a resource. According to another aspect, a unique password can be provided by the NFC device to authenticate access to information in connection with provisioning a resource.

According to a further aspect, provisioning can also include using channel I.D.'s, PAN I.D.'s, Device I.D.'s, and can further include providing a role of a resource, device type, security information, a network key, device profile information including information sufficient to enable communication between a resource manager and the resource being added to the network. A resource manager can provide provisioning information to be provided to an NFC of a resource being added and stored within memory of the NFC for use later. For example, channel numbers, credentials, keys, and other information can be provided. According to another aspect, profile information can also include information about what role the resource is to be when added. As such, a device role can be created. Additional information about other resources within the network can also be provided. For example, information about how to attach to other devices, like a smart meter, can also be provided. According to an aspect, a specific default channel can be provided with a channel I.D., or in some instances, a series of channels can be used to initiate a scan by the new resource to enable the resource to join the network being created. A sequence of channel numbers can also be provided for a resource to scan and join a network.

According to a further aspect, if at decision block 1402 NFC may not be used to provision a resource, the method can proceed to block 1414 and a scan of available WiFi networks can be initiated. For example, a resource can include a WiFi or 802.11-based communication device that can operate as an access point and broadcast a network name unique to the resource. At block 1416, a resource WiFi network name can be detected. According to an aspect, a user may select the network, or in other forms, the network can be accessed in an automated manner. At block 1418, a local WiFi password of a site where a resource may be used can be obtained to join a resource to a local WiFi network. According to an aspect, a stored password can be accessed and in other embodiments a user or other source may provide a password of a local WiFi network. At block 1420, a local WiFi network identifier and password can be communicated to the resource. For example, the WiFi credentials can be communicated using the WiFi network of the resource At block 1422, the resource can connect to a local WiFi network using the WiFi credentials. For example, the resource would enable the WiFi communication device as a network device that can be used to join another access point, such as the local WiFi network. Upon connecting to the local WiFi network, the method can proceed to block 1424 and the resource can be provisioned. The method 1400 ends as depicted by block 1430.

Although described as using WiFi to connect a device to a local network, other forms of communication can also be used. For example, a resource can include Bluetooth communication. As such, local WiFi credentials can be communicated using Bluetooth without a need to have a resource provide a WiFi access point. Other forms of communication can also be used as needed or desired.

Figure 15:
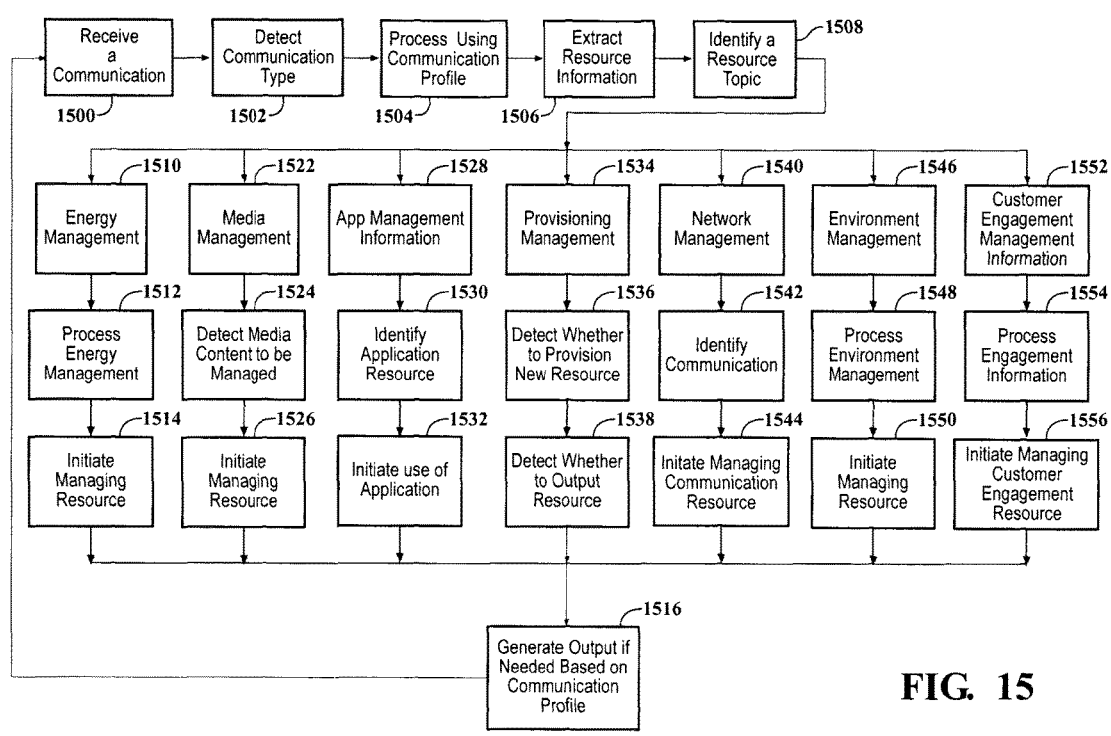
FIG. 15 illustrates a flow diagram of a method of managing a resource according to an aspect of the disclosure.

FIG. 15 illustrates a flow diagram of a method of managing a resource according to an aspect of the disclosure. The method can be used by portions or all of the systems, devices, platforms, applications, services, methods, or any other resource of combination thereof illustrated in FIGS. 1-14 and described herein. The method begins at block 1500 when a communication can be received by a resource management platform, or other resource capable of receiving and processing the communication. At block 1502, a type of communication can be detected. For example, communication can be provided by various types of communication devices as described herein. Upon identifying the type of communication, the method can proceed to block 1504 and can process the communication by applying a profile. For example, if a Z-Wave communication may be received, the method can process the communication using a Z-Wave profile. In other forms, a TCP/IP message may have been received over a WiFi connection. As such, the WiFi communication can be used to access the TCP/IP message data. As such, more than one profile may be needed to process a communication.

According to an aspect, upon processing the communication, resource information may be extracted from the communication at block 1506. The method can then proceed to block 1508 and can identify a resource topic within the extracted resource information. For example, a resource topic may be used with a resource management platform capable of publishing the topic to be used by one or more resources. If a resource subscribes to the topic, the resource information can be accessed and used as needed. For example, resource topic and information can include, but is not limited to, energy management information, media management information, application management information, provisioning management information, network management information, environment management information, customer engagement management information, or various other types of resource management topics, or any combination thereof.

According to a further aspect, a resource can subscribe to multiple resource topics and can use resource information to modify use of a resource. For example, a thermostat having media output capabilities may subscribe to an energy management topic, a media management topic and an environment management topic. As such, the method can publish topics and associated information and the thermostat can receive the resource information and generate an output accordingly. According to a further aspect, multiple devices may subscribe to a topic. For example, multiple wireless speakers may subscribe to a media management information topic and as such, each wireless speaker would receive and use the resource information as needed or desired.

According to an aspect, upon identifying a resource topic at block 1508, the method can proceed based on the topic information detected. Upon use of a resource and resource information the method can proceed to block 1516 as needed or desired. According to a further aspect, if more than one topic may be identified, the method can be modified to process and use resource information based on multiple topics.

According to an aspect, at block 1508 if energy management information may be detected, the method can proceed to block 1510. At block 1512, energy management information can be processed, and the method can proceed to block 1514 and initiate managing a resource using the energy management information. For example, a demand response event may be detected and a resource capable of being altered may be modified. As such, the method at block 1514 can alter an operating condition of the resource. The method can then proceed to block 1516 and 1500 as needed or desired. Various other types of energy management information and resources can also be used as needed or desired.

According to an aspect, at block 1508, if media management information may be detected, the method can proceed to block 1522, and at block 1524, media content to be managed can be detected. For example, a new source of music can be provided, an operating condition of a media resource can be detected, or various other types of media content or information to manage a media resource can be detected. For example, resource information can include a music source to provide information, a target device to output media content, and a sound level to set the media resource at in connection with outputting media. Various other combinations of managing media content can also be provided as needed or desired. The method can proceed to block 1526 and a management of a media resource can be initiated.

According to an aspect, at block 1508, if application management information may be detected, the method can proceed to block 1528. Upon identifying application management information, the method can proceed to block 1530 and can identify an application resource to be used. For example, an application can include a device integrator or installation application, an auto-provisioning application, a weather application, a price alert application, an energy saving tips application, a photo viewer application, a music player application, a video streamer application, an energy monitor application, a music streaming application, a lighting control application, a home security application, a video surveillance application, a calendar application, a reminder application, an appliance control application, a settings application, a third party application, a water sprinkler application, a renewable energy management application, a YouTube application, a Pandora music application, a Picasa photo viewer application, a network monitor application or various other applications that can be detected to manage a resource. For example, upon identifying an application resource, the method can proceed to block 1532 and can initiate use of the application resource and an associated resource. For example, a home security application can be accessed to alter a setting of an alarm. As such, an alarm application can be accessed and resources associated with the alarm application can be accessed and managed. Upon initiating use of the application resources, the method can proceed to block 1516, as described above.

According to an aspect, at block 1508 if provisioning management information may be detected, the method can proceed to block 1534 and to block 1536 to detect whether to provision a new device. For example, a new resource may be detected using a near field communication or other communication device. At block 1536, the method can determine if the resource is authorized or capable of being provisioned. If the device may not be capable of being provisioned, the method can proceed to block 1500, or in other forms, can be modified to allow for accessing provisioning information and obtaining authorization to join. If at block 1536, the resource should be joined, the method can proceed to block 1538 and provisioning can be initiated. The method can proceed to block 1516 as described above.

According to an aspect, if at block 1508 network management information may be detected, the method can proceed to block 1540 and at block 1542 a communication resource of a network to manage can be identified. For example, one or more resources may be using a Zigbee profile to manage communication. As such, if a Zigbee profile may be altered, channel changed, etc. the method can provide a resource topic of the change, and each resource can receive a change to the profile. Other communication resources can also be managed as Zigbee is one example. The method can then proceed to block 1544 and initiate managing the communication resource. The method can proceed to block 1516 as described above.

According to an aspect, at block 1508, if environment management information may be detected, the method can proceed to block 1546 and at block 1548, environment management information can be processed. For example, environment management information can include altering an environment within a room at a site. For example, management can include turning on a light, altering a temperature, modifying an audio level or modifying various other resource that can be used by environment management information. As such, the method can proceed to block 1550 and management of one or more resources can be initiated. The method can proceed to block 1516 as described above.

According to an aspect, if at block 1508 customer engagement management information may be detected, the method can proceed to block 1552. At block 1554, the customer engagement management information can be processed. Upon processing the customer engagement information, the method can proceed to block 1556 and initiate managing a customer engagement resource. For example, a customer may view an energy tip communicated to a media center and to a mobile application. Each resource may subscribe to a customer engagement topic and when a user views the energy tip, a customer engagement resource can be altered. For example, a notification of a new tip may be extinguished on the mobile device and media center. Various other customer engagement processes and resources can also be managed as needed or desired. The method can proceed to block 1516 as described above.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A resource management platform comprising:
   at least one interface, to enable access to a cloud service operable to communicate media management information based on a location of a mobile device relative to a site, the at least one interface being associated with the resource management platform at the site and to communicate with the mobile device;
   a plurality of resources configured to provide media, the plurality of resources being controllable using the at least one interface;
   at least one memory configured to store instructions;
   at least one processor configured to execute the instructions stored in the at least one memory to:
      determine one or more resources that are available among the plurality of resources that are controllable at the site using the at least one interface according to the location of the mobile device,
      detect an incoming communication through the at least one interface as a request to alter the one or more resources that are determined as available in response to the media management information communicated through the cloud service according to the location of the mobile device relative to the site, the request to alter including at least one resource selected among the one or more resources that are determined as available,
      initiate altering of an output of the at least one resource selected among the one or more resources that are determined as available in response to the incoming communication to thereby control the output of the at least one resource selected through the at least one interface, and
      store information of the altered output of the at least one resource selected in association with the media management information communicated through the cloud service within the at least one memory, wherein the information stored is used to control a subsequent output of the at least one resource provided the at least one resource is selected by another request.

2. The resource management platform according to claim 1, wherein, prior to the detecting of the incoming communication, the at least one processor further executes the instructions to:
   determine a travel speed of the mobile device, and
   determine the media and the one or more resources that are determined as available to be controlled at the site based on the determined travel speed of the mobile device and the location of the mobile device relative to the site.

3. The resource management platform according to claim 1, wherein, prior to the detecting of the incoming communication, the at least one processor further executes the instructions to:
   determine a travel time of the mobile device, and
   determine the media and the one or more resources that are determined as available to be controlled to alter at the site based on the determined travel time of the mobile device and the location of the mobile device relative to the site.

4. A resource management platform comprising:
   at least one interface, to enable access to a cloud service operable to communicate media management information based on a location of a mobile device relative to a site, the at least one interface being associated with the resource management platform at the site and to communicate with the mobile device;
   at least one memory configured to store instructions and a plurality of media corresponding each of a plurality of sites including the site, the plurality of media being controllable to be output using the at least one interface;
   at least one processor configured to execute the instructions stored in the at least one memory to:
      determine a media corresponding to the site from among the plurality of media corresponding to the plurality of sites including the site,
      detect an incoming communication through the at least one interface as a request to alter the determined media corresponding to the site in response to the media management information communicated through the cloud service according to the location of the mobile device relative to the site, the request to alter including at least one media selected among the plurality of media corresponding to the plurality of sites including the site,
      initiate altering of an output of the at least one media selected among the plurality of media corresponding to the plurality of sites including the site in response to the incoming communication to thereby control the output of the at least one media selected through the at least one interface, and
      store information of the altered output of the at least one media selected in association with the media management information communicated through the cloud service within the at least one memory, wherein the information stored is used to control a subsequent output of the at least one media provided the at least one media is selected by another request.

* * * * *